United States Patent
Jolna et al.

(10) Patent No.: US 9,113,107 B2
(45) Date of Patent: Aug. 18, 2015

(54) INTERACTIVE ADVERTISING AND PROGRAM PROMOTION IN AN INTERACTIVE TELEVISION SYSTEM

(75) Inventors: Stacy Jolna, Los Angeles, CA (US); Richard P Cusick, Los Angeles, CA (US)

(73) Assignee: Rovi Guides, Inc., Santa Clara, CA (US)

(*) Notice: Subject to any disclaimer, the term of this patent is extended or adjusted under 35 U.S.C. 154(b) by 599 days.

(21) Appl. No.: 11/270,250

(22) Filed: Nov. 8, 2005

(65) Prior Publication Data

US 2007/0107010 A1 May 10, 2007

(51) Int. Cl.
| | |
|---|---|
| H04M 3/00 | (2006.01) |
| H04N 5/445 | (2011.01) |
| G06Q 30/02 | (2012.01) |
| H04N 7/16 | (2011.01) |
| H04N 7/173 | (2011.01) |
| H04N 21/258 | (2011.01) |
| H04N 21/2668 | (2011.01) |
| H04N 21/4147 | (2011.01) |
| H04N 21/433 | (2011.01) |
| H04N 21/442 | (2011.01) |
| H04N 21/45 | (2011.01) |

(Continued)

(52) U.S. Cl.
CPC ........... *H04N 5/44543* (2013.01); *G06Q 30/02* (2013.01); *H04N 5/44591* (2013.01); *H04N 7/163* (2013.01); *H04N 7/17318* (2013.01); *H04N 21/25891* (2013.01); *H04N 21/2668* (2013.01); *H04N 21/4147* (2013.01); *H04N 21/4334* (2013.01); *H04N 21/44222* (2013.01); *H04N 21/458* (2013.01); *H04N 21/4532* (2013.01); *H04N 21/472* (2013.01); *H04N 21/4722* (2013.01); *H04N 21/47214* (2013.01); *H04N 21/812* (2013.01); *H04N 5/45* (2013.01); *H04N 21/478* (2013.01); *H04N 2005/443* (2013.01); *H04N 2005/4428* (2013.01)

(58) Field of Classification Search
USPC ....................................... 725/37–61; 455/420
See application file for complete search history.

(56) References Cited

U.S. PATENT DOCUMENTS

| 2,200,935 A | 5/1940 | Rodriguez |
| 3,153,543 A | 10/1964 | Magyar |

(Continued)

FOREIGN PATENT DOCUMENTS

| AU | 56198/98 | 7/1998 |
| AU | 731010 | 7/1998 |

(Continued)

OTHER PUBLICATIONS

U.S. Appl. No. 09/356,268, filed Jul. 16, 1999, Rudnick et al.

(Continued)

*Primary Examiner* — Mahendra Patel
*Assistant Examiner* — Natasha Cosme
(74) *Attorney, Agent, or Firm* — Ropes & Gray LLP

(57) ABSTRACT

Systems and methods are provided for interactive advertising and program promotion that may attract and maintain user interest. The interactive advertisements may be displayed within interactive television application display screens, such as, an interactive television program guide display screen. A user may be able to select an interactive advertisement and may be presented with interactive content or features that may entice the user to view the advertisement. The interactive content or features may be related or unrelated to the product or service being advertised.

25 Claims, 23 Drawing Sheets

(51) Int. Cl.
*H04N 21/458* (2011.01)
*H04N 21/472* (2011.01)
*H04N 21/4722* (2011.01)
*H04N 21/81* (2011.01)
*H04N 5/45* (2011.01)
*H04N 21/478* (2011.01)
*H04N 5/44* (2011.01)

(56) References Cited

U.S. PATENT DOCUMENTS

| | | |
|---|---|---|
| 3,235,282 A | 2/1966 | Bostick |
| 3,440,427 A | 4/1969 | Kammer |
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,990,713 A | 11/1976 | Hokanson |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,154,850 A | 5/1979 | Morgan et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,234,204 A | 11/1980 | Tibbals |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,313,124 A | 1/1982 | Hara |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,345,262 A | 8/1982 | Shirato et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,458,333 A | 7/1984 | Smith |
| 4,458,907 A | 7/1984 | Meredith |
| 4,459,600 A | 7/1984 | Sato et al. |
| 4,463,359 A | 7/1984 | Ayata et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,804 A | 1/1985 | Hung |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,608,577 A | 8/1986 | Hori |
| 4,608,859 A | 9/1986 | Rockley |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| 4,723,129 A | 2/1988 | Endo et al. |
| RE32,632 E | 3/1988 | Atkinson |
| 4,740,796 A | 4/1988 | Endo et al. |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,799,702 A | 1/1989 | Wang |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |

(56) References Cited

U.S. PATENT DOCUMENTS

| | | |
|---|---|---|
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,991,066 A | 2/1991 | McCowan |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,800 A | 1/1992 | Lockton |
| 5,090,049 A | 2/1992 | Chen |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,177,604 A | 1/1993 | Martinez |
| 5,179,439 A | 1/1993 | Hashimoto et al. |
| 5,179,654 A | 1/1993 | Richards et al. |
| 5,189,630 A | 2/1993 | Barstow et al. |
| 5,191,423 A | 3/1993 | Yoshida et al. |
| 5,195,092 A | 3/1993 | Wilson et al. |
| 5,195,134 A | 3/1993 | Inoue |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,639 A | 2/1994 | Esch et al. |
| 5,283,819 A | 2/1994 | Glick et al. |
| 5,285,278 A | 2/1994 | Holman |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasielewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,419,570 A | 5/1995 | Bollotte |
| 5,423,555 A | 6/1995 | Kidrin |

(56) References Cited

U.S. PATENT DOCUMENTS

| | | | |
|---|---|---|---|
| 5,424,770 | A | 6/1995 | Schmelzer et al. |
| 5,425,101 | A | 6/1995 | Woo et al. |
| 5,426,555 | A | 6/1995 | Lundquist |
| 5,432,561 | A | 7/1995 | Strubbe |
| 5,434,626 | A | 7/1995 | Hayashi et al. |
| 5,436,676 | A | 7/1995 | Pint et al. |
| 5,438,372 | A | 8/1995 | Tsumori et al. |
| 5,440,678 | A | 8/1995 | Eisen et al. |
| 5,444,499 | A | 8/1995 | Saitoh |
| 5,446,919 | A | 8/1995 | Wilkins |
| 5,452,012 | A | 9/1995 | Saitoh |
| 5,459,522 | A | 10/1995 | Pint |
| 5,461,415 | A | 10/1995 | Wolf et al. |
| 5,465,113 | A | 11/1995 | Gilboy |
| 5,465,385 | A | 11/1995 | Ohga et al. |
| 5,469,206 | A | 11/1995 | Strubbe et al. |
| 5,473,442 | A | 12/1995 | Kim |
| 5,477,262 | A | 12/1995 | Banker et al. |
| 5,479,266 | A | 12/1995 | Young et al. |
| 5,479,268 | A | 12/1995 | Young et al. |
| 5,479,497 | A | 12/1995 | Kovarik |
| 5,481,296 | A | 1/1996 | Cragun et al. |
| 5,483,278 | A | 1/1996 | Strubbe et al. |
| 5,485,197 | A | 1/1996 | Hoarty |
| 5,485,219 | A | 1/1996 | Woo |
| 5,485,221 | A | 1/1996 | Banker et al. |
| 5,488,409 | A | 1/1996 | Yuen et al. |
| 5,495,295 | A | 2/1996 | Long |
| 5,502,504 | A | 3/1996 | Marshall et al. |
| 5,515,098 | A | 5/1996 | Carles |
| 5,515,106 | A | 5/1996 | Chaney et al. |
| 5,515,511 | A | 5/1996 | Nguyen et al. |
| 5,517,254 | A | 5/1996 | Monta et al. |
| 5,523,794 | A | 6/1996 | Mankovitz' et al. |
| 5,523,796 | A | 6/1996 | Marshall et al. |
| 5,524,195 | A | 6/1996 | Clanton, III et al. |
| 5,526,034 | A | 6/1996 | Hoarty et al. |
| 5,528,304 | A | 6/1996 | Cherrick et al. |
| 5,532,735 | A | 7/1996 | Blahut et al. |
| 5,532,754 | A | 7/1996 | Young et al. |
| 5,534,911 | A | 7/1996 | Levitan |
| 5,537,141 | A | 7/1996 | Harper et al. |
| 5,539,822 | A | 7/1996 | Lett |
| 5,541,662 | A | 7/1996 | Adams et al. |
| 5,541,738 | A | 7/1996 | Mankovitz |
| 5,546,521 | A | 8/1996 | Martinez |
| 5,550,576 | A | 8/1996 | Klosterman |
| 5,557,338 | A | 9/1996 | Maze et al. |
| 5,557,721 | A | 9/1996 | Fite et al. |
| 5,559,548 | A | 9/1996 | Davis et al. |
| 5,559,549 | A | 9/1996 | Hendricks et al. |
| 5,559,550 | A | 9/1996 | Mankovitz |
| 5,559,942 | A | 9/1996 | Gough et al. |
| 5,561,471 | A | 10/1996 | Kim et al. |
| 5,561,709 | A | 10/1996 | Remillard |
| 5,563,665 | A | 10/1996 | Chang |
| 5,570,295 | A | 10/1996 | Isenberg et al. |
| 5,572,442 | A | 11/1996 | Schulhof et al. |
| 5,574,962 | A | 11/1996 | Fardeau et al. |
| 5,576,755 | A | 11/1996 | Davis et al. |
| 5,579,055 | A | 11/1996 | Hamilton et al. |
| 5,581,479 | A | 12/1996 | McLaughlin et al. |
| 5,582,364 | A | 12/1996 | Trulin et al. |
| 5,583,560 | A | 12/1996 | Florin et al. |
| 5,583,563 | A | 12/1996 | Wanderscheid et al. |
| 5,585,838 | A | 12/1996 | Lawler et al. |
| 5,585,865 | A | 12/1996 | Amano et al. |
| 5,585,866 | A | 12/1996 | Miller et al. |
| 5,589,892 | A | 12/1996 | Knee et al. |
| 5,592,551 | A | 1/1997 | Lett et al. |
| 5,594,490 | A | 1/1997 | Dawson et al. |
| 5,594,509 | A * | 1/1997 | Florin et al. .............. 725/43 |
| 5,594,661 | A | 1/1997 | Bruner et al. |
| 5,596,373 | A | 1/1997 | White et al. |
| 5,600,364 | A | 2/1997 | Hendricks et al. |
| 5,600,366 | A | 2/1997 | Schulman |
| 5,600,573 | A | 2/1997 | Hendricks et al. |
| 5,602,582 | A | 2/1997 | Wanderscheid et al. |
| 5,602,596 | A | 2/1997 | Claussen et al. |
| 5,602,597 | A | 2/1997 | Bertram |
| 5,602,598 | A | 2/1997 | Shintani |
| 5,606,374 | A | 2/1997 | Bertram |
| 5,610,653 | A | 3/1997 | Abecassis |
| 5,617,565 | A | 4/1997 | Augenbraun et al. |
| 5,619,247 | A | 4/1997 | Russo |
| 5,619,249 | A | 4/1997 | Billock et al. |
| 5,619,274 | A | 4/1997 | Roop et al. |
| 5,621,456 | A | 4/1997 | Florin et al. |
| 5,623,613 | A | 4/1997 | Rowe et al. |
| 5,627,940 | A | 5/1997 | Rohra et al. |
| 5,629,733 | A | 5/1997 | Youman et al. |
| 5,630,119 | A | 5/1997 | Aristides et al. |
| 5,631,995 | A | 5/1997 | Weissensteiner et al. |
| 5,633,683 | A | 5/1997 | Rosengren et al. |
| 5,635,978 | A | 6/1997 | Alten et al. |
| 5,635,979 | A | 6/1997 | Kostreski et al. |
| 5,635,989 | A | 6/1997 | Rothmuller |
| 5,636,346 | A | 6/1997 | Saxe |
| 5,640,501 | A | 6/1997 | Turpin |
| 5,640,577 | A | 6/1997 | Scharmer |
| 5,642,153 | A | 6/1997 | Chaney et al. |
| 5,648,813 | A | 7/1997 | Tanigawa et al. |
| 5,648,824 | A | 7/1997 | Dunn et al. |
| 5,650,826 | A | 7/1997 | Eitz |
| 5,650,831 | A | 7/1997 | Farwell |
| 5,652,613 | A | 7/1997 | Lazarus et al. |
| 5,652,615 | A | 7/1997 | Bryant et al. |
| 5,654,748 | A | 8/1997 | Matthews, III |
| 5,654,886 | A | 8/1997 | Zereski, Jr. et al. |
| 5,657,072 | A | 8/1997 | Aristides et al. |
| 5,657,091 | A | 8/1997 | Bertram |
| 5,659,350 | A | 8/1997 | Hendricks et al. |
| 5,659,366 | A | 8/1997 | Kerman |
| 5,661,516 | A | 8/1997 | Carles |
| 5,661,517 | A | 8/1997 | Budow et al. |
| 5,663,757 | A | 9/1997 | Morales |
| 5,664,111 | A | 9/1997 | Nahan et al. |
| 5,666,293 | A | 9/1997 | Metz |
| 5,666,498 | A | 9/1997 | Amro |
| 5,666,645 | A | 9/1997 | Thomas et al. |
| 5,671,276 | A | 9/1997 | Eyer et al. |
| 5,671,411 | A | 9/1997 | Watts et al. |
| 5,675,390 | A | 10/1997 | Schindler et al. |
| 5,675,752 | A | 10/1997 | Scott et al. |
| 5,677,708 | A | 10/1997 | Matthews, III et al. |
| 5,677,981 | A | 10/1997 | Kato et al. |
| 5,682,195 | A | 10/1997 | Hendricks et al. |
| 5,682,206 | A | 10/1997 | Wehmeyer et al. |
| 5,684,525 | A | 11/1997 | Klosterman |
| 5,686,954 | A | 11/1997 | Yoshinobu et al. |
| 5,687,331 | A | 11/1997 | Volk et al. |
| 5,689,648 | A | 11/1997 | Diaz et al. |
| 5,689,666 | A | 11/1997 | Berquist et al. |
| 5,692,214 | A | 11/1997 | Levine |
| 5,694,163 | A | 12/1997 | Harrison |
| 5,694,176 | A | 12/1997 | Bruette et al. |
| 5,694,381 | A | 12/1997 | Sako |
| 5,696,905 | A | 12/1997 | Reimer et al. |
| 5,699,052 | A | 12/1997 | Miyahara |
| 5,699,107 | A | 12/1997 | Lawler et al. |
| 5,699,125 | A | 12/1997 | Rzeszewski et al. |
| 5,708,478 | A | 1/1998 | Tognazzini |
| 5,710,601 | A | 1/1998 | Marshall et al. |
| 5,710,815 | A | 1/1998 | Ming et al. |
| 5,710,884 | A | 1/1998 | Dedrick |
| 5,715,314 | A | 2/1998 | Payne et al. |
| 5,715,399 | A | 2/1998 | Bezos |
| 5,717,452 | A | 2/1998 | Janin et al. |
| 5,717,923 | A | 2/1998 | Dedrick |
| 5,721,829 | A | 2/1998 | Dunn et al. |
| 5,722,041 | A | 2/1998 | Freadman |
| 5,724,103 | A | 3/1998 | Batchelor |
| 5,724,521 | A | 3/1998 | Dedrick |
| 5,724,525 | A | 3/1998 | Beyers et al. |

(56) References Cited

U.S. PATENT DOCUMENTS

| | | |
|---|---|---|
| 5,724,567 A | 3/1998 | Rose et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li |
| 5,737,028 A | 4/1998 | Bertram et al. |
| 5,737,030 A | 4/1998 | Hong et al. |
| 5,740,549 A | 4/1998 | Reilly et al. |
| 5,745,710 A | 4/1998 | Clanton et al. |
| 5,751,282 A | 5/1998 | Matthews et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,887 A | 6/1998 | Wolff et al. |
| 5,778,181 A | 7/1998 | Hidary et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,781,734 A | 7/1998 | Ohno et al. |
| 5,784,258 A | 7/1998 | Quinn |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,793,438 A | 8/1998 | Bedard |
| 5,793,964 A | 8/1998 | Rogers et al. |
| 5,793,972 A | 8/1998 | Shane et al. |
| 5,797,011 A | 8/1998 | Kroll et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,809,242 A | 9/1998 | Shaw et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,842,010 A | 11/1998 | Jain et al. |
| 5,842,199 A | 11/1998 | Miller et al. |
| 5,844,552 A | 12/1998 | Gaughan et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer |
| 5,867,227 A | 2/1999 | Yamaguchi |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,892,767 A | 4/1999 | Bell et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughn et al. |
| 5,907,322 A | 5/1999 | Kelly et al. |
| 5,907,323 A | 5/1999 | Lawler et al. |
| 5,907,366 A | 5/1999 | Farmer et al. |
| 5,914,712 A | 6/1999 | Sartain et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,931,905 A | 8/1999 | Hashimoto et al. |
| 5,936,614 A | 8/1999 | An et al. |
| 5,936,679 A | 8/1999 | Kasahara et al. |
| 5,937,160 A | 8/1999 | Davis et al. |
| 5,940,073 A | 8/1999 | Klosterman et al. |
| 5,940,572 A | 8/1999 | Balaban et al. |
| 5,940,614 A | 8/1999 | Allen et al. |
| 5,945,988 A | 8/1999 | Williams et al. |
| 5,946,386 A | 8/1999 | Rogers et al. |
| 5,949,954 A | 9/1999 | Young et al. |
| 5,951,642 A | 9/1999 | Onoe et al. |
| 5,955,988 A | 9/1999 | Blonstein et al. |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,991,799 A | 11/1999 | Yen et al. |
| 5,999,912 A | 12/1999 | Wodarz et al. |
| 6,002,393 A | 12/1999 | Hite et al. |

(56) References Cited

U.S. PATENT DOCUMENTS

| | | |
|---|---|---|
| 6,002,394 A | 12/1999 | Schein et al. |
| 6,005,561 A | 12/1999 | Hawkins et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki |
| 6,008,803 A | 12/1999 | Rowe et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,027,198 A | 2/2000 | Tanaka et al. |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,097,499 A | 8/2000 | Casey et al. |
| 6,098,065 A | 8/2000 | Skillen et al. |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,139,177 A | 10/2000 | Venkatraman et al. |
| 6,141,003 A | 10/2000 | Chor et al. |
| 6,144,376 A | 11/2000 | Connelly |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,160,989 A | 12/2000 | Hendricks et al. |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,209,129 B1 | 3/2001 | Carr et al. |
| 6,209,130 B1 | 3/2001 | Rector, Jr. et al. |
| 6,211,901 B1 | 4/2001 | Imajima et al. |
| 6,212,553 B1 | 4/2001 | Lee et al. |
| 6,216,264 B1 | 4/2001 | Maze et al. |
| 6,234,973 B1 | 5/2001 | Meador et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang et al. |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,331,877 B1 | 12/2001 | Bennington et al. |
| 6,335,963 B1 | 1/2002 | Bosco |
| 6,341,195 B1 | 1/2002 | Mankovitz et al. |
| 6,341,374 B2 | 1/2002 | Schein et al. |
| 6,342,926 B1 | 1/2002 | Hanafee et al. |
| 6,348,033 B1 | 2/2002 | Catlett |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,359,661 B1 | 3/2002 | Nickum |
| 6,363,525 B1 | 3/2002 | Dougherty et al. |
| 6,373,528 B1 | 4/2002 | Bennington et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,370 B1 | 6/2002 | Jarrell |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,487,362 B1 | 11/2002 | Yuen et al. |
| 6,498,895 B2 | 12/2002 | Young et al. |
| 6,502,241 B1 | 12/2002 | Kretz et al. |
| 6,505,348 B1 | 1/2003 | Knowles et al. |
| 6,515,680 B1 | 2/2003 | Hendricks et al. |
| 6,516,467 B1 | 2/2003 | Schindler et al. |
| 6,530,082 B1 | 3/2003 | Del Sesto et al. |
| 6,539,548 B1 | 3/2003 | Hendricks et al. |
| 6,542,169 B1 | 4/2003 | Marshall et al. |

(56) References Cited

U.S. PATENT DOCUMENTS

| | | |
|---|---|---|
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews et al. |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,675,386 B1 | 1/2004 | Hendricks et al. |
| 6,678,706 B1 | 1/2004 | Fishel |
| 6,687,906 B1 | 2/2004 | Yuen et al. |
| 6,698,020 B1 | 2/2004 | Zigmond et al. |
| 6,732,369 B1 | 5/2004 | Schein |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,754,904 B1 | 6/2004 | Cooper et al. |
| 6,756,997 B1 | 6/2004 | Ward, III et al. |
| 6,757,691 B1 | 6/2004 | Welsh et al. |
| 6,757,906 B1 | 6/2004 | Look et al. |
| 6,769,128 B1 | 7/2004 | Knee et al. |
| 6,792,618 B1 | 9/2004 | Bendinelli et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,850,693 B2 | 2/2005 | Young et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,047,547 B2 | 5/2006 | Alten et al. |
| 7,047,550 B1 | 5/2006 | Yasukawa et al. |
| 7,058,635 B1 | 6/2006 | Shah-Nazaroff et al. |
| 7,069,576 B1 | 6/2006 | Knudson et al. |
| 7,117,518 B1 | 10/2006 | Takahashi et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,188,356 B1 | 3/2007 | Miura et al. |
| 7,200,852 B1 | 4/2007 | Block |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,356,547 B2 | 4/2008 | Ozer et al. |
| 7,398,541 B2 | 7/2008 | Bennington et al. |
| 7,421,724 B2 | 9/2008 | Klosterman et al. |
| 7,437,751 B2 | 10/2008 | Daniels |
| 7,480,929 B2 | 1/2009 | Klosterman et al. |
| 7,493,641 B2 | 2/2009 | Klosterman et al. |
| 7,552,459 B2 | 6/2009 | Klosterman et al. |
| 7,813,822 B1 | 10/2010 | Hoffberg et al. |
| 8,272,011 B2 | 9/2012 | Yuen |
| 2001/0001160 A1 | 5/2001 | Schoff et al. |
| 2001/0029610 A1 | 10/2001 | Corvin et al. |
| 2001/0032333 A1* | 10/2001 | Flickinger ............... 725/39 |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corwin |
| 2002/0026496 A1 | 2/2002 | Boyer et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059599 A1 | 5/2002 | Schein et al. |
| 2002/0059602 A1 | 5/2002 | Macrae et al. |
| 2002/0073424 A1 | 6/2002 | Ward, III et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |
| 2002/0120933 A1 | 8/2002 | Knudson et al. |
| 2002/0124249 A1 | 9/2002 | Shintani et al. |
| 2002/0124255 A1* | 9/2002 | Reichardt et al. ............... 725/42 |
| 2002/0138840 A1 | 9/2002 | Schein et al. |
| 2002/0153685 A1 | 10/2002 | Day et al. |
| 2002/0171686 A1 | 11/2002 | Kamen et al. |
| 2003/0005432 A1 | 1/2003 | Ellis et al. |
| 2003/0005445 A1 | 1/2003 | Schein et al. |
| 2003/0051241 A1 | 3/2003 | Klosterman et al. |
| 2003/0076347 A1 | 4/2003 | Barrett et al. |
| 2003/0101454 A1 | 5/2003 | Ozer et al. |
| 2003/0110171 A1 | 6/2003 | Ozer et al. |
| 2003/0110495 A1 | 6/2003 | Bennington et al. |
| 2003/0110499 A1* | 6/2003 | Knudson et al. ............... 725/42 |
| 2003/0115593 A1 | 6/2003 | Alten et al. |
| 2003/0115599 A1 | 6/2003 | Bennington et al. |
| 2003/0115602 A1 | 6/2003 | Knee et al. |
| 2003/0126607 A1* | 7/2003 | Phillips et al. ............... 725/55 |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003397 A1 | 1/2004 | Boston et al. |
| 2004/0003407 A1 | 1/2004 | Hanafee et al. |
| 2004/0010806 A1* | 1/2004 | Yuen et al. ............... 725/136 |
| 2004/0022278 A1 | 2/2004 | Thomas et al. |
| 2004/0049787 A1 | 3/2004 | Maissel et al. |
| 2004/0078809 A1 | 4/2004 | Drazin |
| 2004/0078815 A1 | 4/2004 | Lemmons et al. |
| 2004/0111742 A1 | 6/2004 | Hendricks et al. |
| 2004/0139465 A1 | 7/2004 | Matthews et al. |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2004/0210935 A1 | 10/2004 | Schein et al. |
| 2004/0221310 A1 | 11/2004 | Herrington et al. |
| 2004/0243470 A1 | 12/2004 | Ozer et al. |
| 2005/0010949 A1 | 1/2005 | Ward et al. |
| 2005/0015804 A1 | 1/2005 | LaJoie et al. |
| 2005/0015815 A1 | 1/2005 | Shoff et al. |
| 2005/0028201 A1 | 2/2005 | Klosterman et al. |
| 2005/0097622 A1* | 5/2005 | Zigmond et al. ............... 725/135 |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0204388 A1 | 9/2005 | Knudson et al. |
| 2005/0216936 A1 | 9/2005 | Knudson |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |
| 2005/0278741 A1 | 12/2005 | Robarts et al. |
| 2005/0283796 A1 | 12/2005 | Flickinger |
| 2006/0031916 A1 | 2/2006 | Colter et al. |
| 2006/0037044 A1 | 2/2006 | Daniels |
| 2006/0075451 A1* | 4/2006 | Gupta et al. ............... 725/135 |
| 2006/0248555 A1* | 11/2006 | Eldering ............... 725/34 |
| 2006/0248558 A1 | 11/2006 | Barton et al. |
| 2006/0277574 A1 | 12/2006 | Schein et al. |
| 2007/0016926 A1 | 1/2007 | Ward, III et al. |
| 2007/0033613 A1 | 2/2007 | Ward, III et al. |
| 2007/0162934 A1 | 7/2007 | Roop et al. |
| 2007/0186240 A1 | 8/2007 | Ward, III et al. |
| 2007/0243155 A1 | 10/2007 | Bottiglieri et al. |

(56) References Cited

U.S. PATENT DOCUMENTS

| | | |
|---|---|---|
| 2007/0271582 A1 | 11/2007 | Ellis et al. |
| 2008/0086745 A1 | 4/2008 | Knudson et al. |
| 2008/0109284 A1 | 5/2008 | Slaney et al. |
| 2008/0127263 A1 | 5/2008 | Klosterman et al. |
| 2008/0127264 A1 | 5/2008 | Klosterman et al. |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184296 A1 | 7/2008 | Alten et al. |
| 2008/0184308 A1 | 7/2008 | Herrington et al. |
| 2008/0184312 A1 | 7/2008 | Schein et al. |
| 2008/0184315 A1 | 7/2008 | Ellis et al. |
| 2008/0189744 A1 | 8/2008 | Schein et al. |
| 2008/0216111 A1 | 9/2008 | Alten et al. |
| 2008/0235725 A1 | 9/2008 | Hendricks |
| 2008/0288980 A1 | 11/2008 | Schein et al. |
| 2008/0301733 A1 | 12/2008 | Yuen et al. |
| 2009/0070817 A1 | 3/2009 | Ellis et al. |
| 2010/0122282 A1 | 5/2010 | DuBose |
| 2010/0211975 A1 | 8/2010 | Boyer et al. |
| 2010/0223643 A1 | 9/2010 | Yuen et al. |
| 2010/0274666 A1 | 10/2010 | Wilf et al. |
| 2011/0078628 A1 | 3/2011 | Rosenberg et al. |
| 2011/0191804 A1 | 8/2011 | Klosterman et al. |

FOREIGN PATENT DOCUMENTS

| | | |
|---|---|---|
| AU | 700302 | 12/1998 |
| AU | 733993 | 2/1999 |
| AU | 701683 | 5/1999 |
| AU | 705839 | 6/1999 |
| AU | 730507 | 3/2001 |
| AU | 743395 | 5/2002 |
| AU | 754696 | 11/2002 |
| AU | 2003200576 | 5/2003 |
| AU | 2004203044 | 7/2004 |
| AU | 2005234652 | 12/2005 |
| BR | 9609120 | 8/1999 |
| BR | 9608903 | 9/1999 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2200348 | 9/1994 |
| CA | 2164608 | 12/1994 |
| CA | 2362627 | 11/1995 |
| CA | 2362630 | 11/1995 |
| CA | 2363051 | 11/1995 |
| CA | 2363052 | 11/1995 |
| CA | 2548637 | 11/1995 |
| CA | 2662685 | 11/1995 |
| CA | 2466894 | 4/1996 |
| CA | 2223018 | 12/1996 |
| CA | 2223057 | 12/1996 |
| CA | 2274560 | 6/1998 |
| CA | 2285645 A1 | 7/1998 |
| CA | 2297039 | 1/1999 |
| CA | 2312326 | 6/1999 |
| CA | 2190744 | 5/2002 |
| CA | 2274560 | 6/2007 |
| CA | 2581116 | 9/2010 |
| CN | 306099 | 5/1997 |
| CN | 1244990 | 2/2000 |
| CN | 1555191 | 12/2004 |
| CN | 1567986 | 1/2005 |
| DE | 2918846 | 11/1980 |
| DE | 3246225 | 6/1984 |
| DE | 3337204 | 4/1985 |
| DE | 36 21 263 | 1/1988 |
| DE | 3640436 | 6/1988 |
| DE | 3621263 | 7/1988 |
| DE | 3909334 | 9/1990 |
| DE | 42 01 031 | 7/1993 |
| DE | 4217246 | 12/1993 |
| DE | 4240187 | 6/1994 |
| DE | 4407701 | 9/1995 |
| DE | 4427046 | 2/1996 |
| DE | 4440419 | 5/1996 |
| DE | 19531121 A1 | 2/1997 |
| DE | 3909334 | 2/1998 |
| DE | 4437928 | 10/1998 |
| DE | 30 21 203 | 12/1998 |
| DE | 19740079 A1 | 3/1999 |
| DE | 19931046 | 1/2001 |
| DE | 69723999 | 6/2004 |
| EP | 0723369 | 8/1942 |
| EP | 0 239 884 | 10/1987 |
| EP | 0276425 | 8/1988 |
| EP | 0337336 | 10/1989 |
| EP | 0408892 | 1/1990 |
| EP | 0393555 | 10/1990 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 A2 | 5/1991 |
| EP | 0 444 496 B1 | 9/1991 |
| EP | 0 447 968 A2 | 9/1991 |
| EP | 0 532 322 | 3/1993 |
| EP | 0 550 911 | 7/1993 |
| EP | 0554577 | 8/1993 |
| EP | 0 560 593 A2 | 9/1993 |
| EP | 0 572 090 B | 12/1993 |
| EP | 0339675 | 2/1994 |
| EP | 0617563 | 9/1994 |
| EP | 0624040 | 11/1994 |
| EP | 0682452 A2 | 11/1995 |
| EP | 0 721 253 A2 | 7/1996 |
| EP | 0721253 | 7/1996 |
| EP | 0 725 539 | 8/1996 |
| EP | 0742669 | 11/1996 |
| EP | 0 752 767 A2 | 1/1997 |
| EP | 0 753 964 A1 | 1/1997 |
| EP | 0 762 751 | 3/1997 |
| EP | 0 772 360 A2 | 5/1997 |
| EP | 0 774 866 A2 | 5/1997 |
| EP | 0 775 417 B1 | 5/1997 |
| EP | 0774866 | 5/1997 |
| EP | 0 784 405 A2 | 7/1997 |
| EP | 0 805 594 B1 | 11/1997 |
| EP | 0805594 | 11/1997 |
| EP | 0 822 718 A1 | 2/1998 |
| EP | 0 784 405 A3 | 3/1998 |
| EP | 0 827 340 A2 | 3/1998 |
| EP | 0 834 798 | 4/1998 |
| EP | 0837599 | 4/1998 |
| EP | 0 848 554 A2 | 6/1998 |
| EP | 0 849 948 A2 | 6/1998 |
| EP | 0 851 681 A1 | 7/1998 |
| EP | 0 852 442 A2 | 7/1998 |
| EP | 0 854 645 | 7/1998 |
| EP | 0 854 654 A2 | 7/1998 |
| EP | 0852361 | 7/1998 |
| EP | 0 880 856 B1 | 12/1998 |
| EP | 0 905 985 A2 | 3/1999 |
| EP | 0 924 927 A2 | 6/1999 |
| EP | 0 935 393 A2 | 8/1999 |
| EP | 0 944 253 A1 | 9/1999 |
| EP | 0945003 | 9/1999 |
| EP | 0 963 119 A1 | 12/1999 |
| EP | 0 988 876 | 3/2000 |
| EP | 1 095 504 B1 | 5/2001 |
| EP | 1152605 | 11/2001 |
| EP | 0 856 227 | 12/2001 |
| EP | 0 830 787 | 2/2002 |
| EP | 0 822 718 B1 | 6/2002 |
| EP | 1 036 466 | 3/2003 |
| EP | 1361751 | 11/2003 |
| EP | 0 880 856 | 3/2005 |
| EP | 1763234 | 3/2007 |
| FR | 2662805 | 12/1991 |

(56) References Cited

FOREIGN PATENT DOCUMENTS

| | | |
|---|---|---|
| FR | 2662895 | 12/1991 |
| FR | 2726718 | 5/1996 |
| GB | 1 554 411 | 10/1979 |
| GB | 2034995 | 6/1980 |
| GB | 2126002 | 3/1984 |
| GB | 2185670 | 7/1987 |
| GB | 2256546 | 12/1992 |
| GB | 2 264 409 | 8/1993 |
| GB | 2309134 A | 7/1997 |
| HK | 1061496 | 9/1997 |
| HK | 1023018 | 5/2004 |
| HK | 1013781 | 2/2005 |
| HK | 1035285 | 3/2005 |
| JP | 5456857 | 5/1979 |
| JP | 58-137334 | 8/1983 |
| JP | 58-137344 | 8/1983 |
| JP | 58-196738 | 11/1983 |
| JP | 58 210776 A | 12/1983 |
| JP | 59123670 | 7/1984 |
| JP | 59-141878 | 8/1984 |
| JP | 59138461 | 8/1984 |
| JP | 60-061935 | 4/1985 |
| JP | 6071260 | 4/1985 |
| JP | 61-050470 | 3/1986 |
| JP | 61-074476 | 4/1986 |
| JP | 62-060370 | 3/1987 |
| JP | 62-060384 | 3/1987 |
| JP | 6392177 | 4/1988 |
| JP | 63 234679 A | 9/1988 |
| JP | 01-307944 | 12/1989 |
| JP | 02-048879 | 2/1990 |
| JP | 02-119307 | 5/1990 |
| JP | 03063990 | 3/1991 |
| JP | 03-214919 | 9/1991 |
| JP | 03-243076 | 10/1991 |
| JP | 04079053 | 3/1992 |
| JP | 04-162889 | 6/1992 |
| JP | 04-180480 | 6/1992 |
| JP | 04-227380 | 8/1992 |
| JP | 04-335395 | 11/1992 |
| JP | 05-183826 | 7/1993 |
| JP | 05-284437 | 10/1993 |
| JP | 05260400 | 10/1993 |
| JP | 06-021907 | 1/1994 |
| JP | 06038165 | 2/1994 |
| JP | 06-133235 | 5/1994 |
| JP | 06-504165 | 5/1994 |
| JP | 06504165 | 5/1994 |
| JP | 06-243539 | 9/1994 |
| JP | 07-020254 | 1/1995 |
| JP | 07-20254 | 1/1995 |
| JP | 07-050259 | 2/1995 |
| JP | 07-076592 | 3/1995 |
| JP | 07-123326 | 5/1995 |
| JP | 07-135621 | 5/1995 |
| JP | 5-339100 | 6/1995 |
| JP | 07-147657 | 6/1995 |
| JP | 07-154349 | 6/1995 |
| JP | 07-160732 | 6/1995 |
| JP | 07-184131 | 7/1995 |
| JP | 07-193762 | 7/1995 |
| JP | 07-284033 | 10/1995 |
| JP | 07-288759 | 10/1995 |
| JP | 07-321748 | 12/1995 |
| JP | 08-32528 | 2/1996 |
| JP | 08-32538 | 2/1996 |
| JP | 08-044268 | 2/1996 |
| JP | 8-111823 | 4/1996 |
| JP | 08-125497 | 5/1996 |
| JP | 8-137334 | 5/1996 |
| JP | 8-506469 | 7/1996 |
| JP | 08-506941 | 7/1996 |
| JP | 8-196738 | 8/1996 |
| JP | 08-251122 | 9/1996 |
| JP | 08-275077 | 10/1996 |
| JP | 9-037151 | 2/1997 |
| JP | 9-37168 | 2/1997 |
| JP | 09-037172 | 2/1997 |
| JP | 0903751 | 2/1997 |
| JP | 09-102827 | 4/1997 |
| JP | 9-141878 | 6/1997 |
| JP | 10-143340 | 5/1998 |
| JP | 10-143349 | 5/1998 |
| JP | 10-512420 | 11/1998 |
| JP | 2-838892 | 12/1998 |
| JP | 2838892 | 12/1998 |
| JP | 11-259248 | 9/1999 |
| JP | 2001-213595 | 8/2001 |
| JP | 2001-1513595 | 9/2001 |
| JP | 3228754 | 11/2001 |
| JP | 2002-279969 | 9/2002 |
| JP | 2003-189200 | 7/2003 |
| JP | 4083525 | 7/2003 |
| JP | 3512195 | 3/2004 |
| JP | 2005-102342 | 4/2005 |
| JP | 2007-184947 | 7/2007 |
| JP | 4062577 | 3/2008 |
| JP | 4382116 | 12/2009 |
| JP | 4415032 | 2/2010 |
| JP | 4415033 | 2/2010 |
| JP | 4415034 | 2/2010 |
| JP | 4512618 | 7/2010 |
| JP | 4564839 | 10/2010 |
| WO | WO 86/01359 | 2/1986 |
| WO | WO 86/01962 | 3/1986 |
| WO | WO 87/03766 | 6/1987 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91/05436 | 4/1991 |
| WO | WO 91/18476 | 11/1991 |
| WO | WO 92/04801 | 3/1992 |
| WO | WO 92/06367 | 4/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/13107 | 6/1994 |
| WO | WO 94/14280 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/21085 | 9/1994 |
| WO | WO 94/23383 | 10/1994 |
| WO | WO 94/29811 | 12/1994 |
| WO | WO 95/01056 | 1/1995 |
| WO | WO 95/01057 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/16568 | 6/1995 |
| WO | WO 95/19092 A1 | 7/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO 95/32587 | 11/1995 |
| WO | WO 95/32957 | 12/1995 |
| WO | WO 96/07270 | 3/1996 |

(56) References Cited

FOREIGN PATENT DOCUMENTS

| | | |
|---|---|---|
| WO | WO 96/08109 | 3/1996 |
| WO | WO 96/08113 | 3/1996 |
| WO | WO 96/09721 | 3/1996 |
| WO | WO 96/13013 | 5/1996 |
| WO | WO 96/13932 A1 | 5/1996 |
| WO | WO 96/13935 | 5/1996 |
| WO | WO 96/17467 | 6/1996 |
| WO | WO 96/17473 | 6/1996 |
| WO | WO 96/21990 | 7/1996 |
| WO | WO 96/26605 | 8/1996 |
| WO | WO 96/27270 | 9/1996 |
| WO | WO 96/27982 | 9/1996 |
| WO | WO 96/27989 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/37996 | 11/1996 |
| WO | WO 96/38799 | 12/1996 |
| WO | WO 96/38962 | 12/1996 |
| WO | WO 96/41471 | 12/1996 |
| WO | WO 96/41477 | 12/1996 |
| WO | WO 96/41478 | 12/1996 |
| WO | WO 97/02702 | 1/1997 |
| WO | WO 97/04595 | 2/1997 |
| WO | WO 97/07656 | 3/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/45786 | 12/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 97/50251 | 12/1997 |
| WO | WO 98/06219 | 2/1998 |
| WO | WO 98/10589 | 3/1998 |
| WO | WO 98/16062 | 4/1998 |
| WO | WO 98/17063 | 4/1998 |
| WO | WO 98/17064 | 4/1998 |
| WO | WO 98/20675 | 5/1998 |
| WO | WO 98/21664 | 5/1998 |
| WO | WO 98/21877 | 5/1998 |
| WO | WO 88/04507 | 6/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 99/01984 | 1/1999 |
| WO | WO 99/04561 | 1/1999 |
| WO | WO 99/07142 | 2/1999 |
| WO | WO 99/14947 | 3/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/31731 | 4/2002 |
| WO | 02/084992 | * 10/2002 |
| WO | WO 02/084992 | 10/2002 |
| WO | WO 02/084992 A2 | * 10/2002 |

OTHER PUBLICATIONS

"272OR Satellite Receiver User's Guide," *General Instrument*, 1991, pp. 58-61.

"Addressable Converters: A New Development at CableData," *Via Cable*, vol. 1, No. 12, Dec. 1981.

"Bell Atlantic Buys Cable TV Company for $22bn," *Financial Times* (London), Oct. 14, 1993 p. 65.

"Cable Television Equipment," Jerrold Communications Publication, dated 1992 and 1993, pp. 8-2.1 to 8-6 and 8-14.1 to 8-14.3.

"Computer Network: Current Status and Outlook on Leading Science and Technology," Bureau of Science & Technology (Japan), vol. 1, Dec. 1986.

Creation/Modification of the Audio Signal Processor Setup for a PC Audio Editor, IBM Technical Disclosure Bulletin, vol. 30, No. 10, Mar. 1988, pp. 367-376.

"D2B-Home Bus Fur Audio and Video," Selektor, Apr. 1990, pp. 10, 12.

"Dial M for Movie", Funkschau Nov. 1994 Perspektiven, Video on Demand, pp. 78-79. (English language translation attached).

"Digital Video Broadcasting (DVB); DVB specification for data broadcasting," European Telecommunication Standards Institute, Draft EN 301 192 V1.2.1 (Jan. 1999).

"'Duck Tales,'(1987)[TV Series 1987-1990]," Internet Movie Database (IMDB) [Retrieved on Apr. 7, 2007].

"Electronic Programme Guide (EPG); Protocol for a TV Guide using electronic data transmission," by European Telecommunication Standards Institute, May 1997, Valbonne, France, publication No. ETS 300 707.

"Enhanced Content Specification," "ATVEF," from the internet at http://www.atvef.com/library/spec.html, printed Aug. 22, 2001, the document bears a Copyright date of 1998, 1999, 2000.

"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.

"Facsimile Transmission," NHK Research Monthly Report, Dec. 1987(Unknown author).

"Getting Started" Installation Guide, "Using Starsight 1" Manual, and Remote Control "Quick Reference Guide."

"Interactive Computer Conference Server," IBM Technical Bulletin, vol. 34, No. 7A, Dec. 1991, pp. 375-377.

"Interface Device for Conventional TVs to Improve Functionality," IBM Technical Disclosure Bulletin, vol. 36, No. 7, Jul. 1993, pp. 53-54.

"James Sorce, David Fay, Brian Raila and Robert Virzi, Designing a Broadband Residential Entertainment Service: A Case Study," GTE Laboratories Incorporated, undated, pp. 141-148.

"Lists> What's on Tonite! TV Listings (fwd)," Internet article (On line), Jan. 28, 1995, XP 002378869 [Retrieved on Apr. 28, 2006].

(56) References Cited

OTHER PUBLICATIONS

"MSI Datacasting Systems," TV Communications Journal, Jan. 1973.

"Open TV fur interaktives Fernsehen," Trend and Technik, Sep. 1995 RFE, p. 100. (English language translation attached).

"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.

"Prevue Networks and OpenTV(R) Agree to Work Together on Deploying Interactive Program Guides Worldwide," from the internet at htte://www.opentv.com/news/prevuefinal.htm printed on Jun. 28, 1999.

"Probe XL Brochure, Auto Tote Systems Inc.," (Newark, Delaware) (undated) 57 pgs.

"Rewind, reply and unwind with new high-tech TV devices," by Lawrence J. Magid, *LA Times*. This document was printed from the internet on Jun. 6, 1999 and bears a date of May 19, 1999.

"Technological Examination & Basic Investigative Research Report on Image Databases," Japan Mechanical Engineering Organization Int'l Society for the Advancement of Image Software, Japan, Mar. 1988.

"Technology: Turn on, tune in and print out—An experimental interactive television service is set to alter our viewing habits," *Financial Times* (London), Oct. 14, 1993, p. 11.

"The New Media and Broadcast Policy: An Investigation & Research Conference Report on Broadcasting Diversification," Radio Regulatory Bureau, Japan Ministry of Posts & Telecommunications, Mar. 1982.

"TV Listings Functional Spec.," Time Video Information Services, Inc., undated.

"Using StarSight 2," Instruction Manual, StarSight Telecast, Inc., Starsight CB 1500 Customer Letter, 1994.

"Windows 98 Feature Combines TV, Terminal and the Internet," *New York Times*, Aug. 18, 1998.

"Prodigy Launches Interactive TV Listing", Apr. 22, 1994 public Broadcasting Report.

"StarSight Interactive Television Program Guide III" Jim Leftwich and Steve Schein, Functional/Interactional Architecture Specification Document, Orbit Interaction, Palo alto, California, Published before Apr. 19, 1995.

"StarSight Interactive Television Program Guide IV" Jim Leftwich and Steve Schein, Functional/Interactional Architecture Specification Document, Orbit Interaction, Palo Alto, California, Published before Apr. 19, 1995.

"StarSight Interactive Television Program Guide" Jim Leftwich, Willy Lai & Steve Schein Published before Apr. 19, 1995.

"TV Guide Online Set for Fall", Entertainment Marketing Letter, Aug. 1994.

Advertisement for "TV Decisions," Cable Vision, Aug. 4, 1986.

Alexander, Michael "Visualizing cleared-off desktops," Computerworld, May 6, 1991, p. 20.

Antonoff, M., "Stay Tuned for Smart TV," Popular Science, Nov. 1990, pp. 62-65.

Baer, R.H, "Innovative Add-On TV Products," IEEE Transactions on Consumer Electronics, vol. CE-25, Nov. 1979, pp. 765-771.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach to Addressability," CableData, undated.

Brochure, "Westar and Videotoken Network Present the CableComputer," Revised Aug. 15, 1985 (Plaintiffs 334).

Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).

Brochure, VTN "Videotoken Network, New Dimension Television," Dec. 1985 (Plaintiffs Exhibit 313).

Brugliera, Vito., "Digital On-Screen Display— A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiff's Exhibit 289).

CableData, Roseville Consumer Presentation, Mar. 1985.

Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Cox, J. et al, "Extended Services in a Digital Compression System," *Proceedings from Eleven Technical Sessions: 42nd Annual Convention and Exposition of the National Cable Television Association*, Jun. 1993, pp. 185-191.

Damouny, N.G., "Teletext Decoders—Keeping Up With the Latest Advances," IEEE Transactions on Consumer Electronics, vol. CE-30, No. 3, Aug. 1984, pp. 429-435.

Declaration Under 37 C.F.R. § 1.132 of Richard E. Glassberg, signed Oct. 20, 2006, filed Oct. 24, 2006, from U.S. Appl. No. 10/346,266.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, vol. 83 No. 1, pp. 14-19.

Eitz, Gerhard, "Zukünftige Informations-und Datenangebote beim digitalen Fernsehen—EPG Und 'Lesezeichen'," RTM Rundfunktechnische Mitteilungen, Jun. 1997, vol. 41, pp. 67-72.

European Search Report dated Nov. 19, 2002 from European Application No. 989446111.7.

European Telecommunication Standard, "Electronic Programme Guide (EPG); Protocol for a TV Guide using electronic data transmission," pp. 1-45, sections 1-11.12.7 and annex A-P, bearing a date of May 1997.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing via Broadcast Teletext," IEEE Transactions on Consumer Electronics, vol. CE-25, No. 3, Jul. 1979, pp. 279-287.

Hiroshi Ishii et al, "Clearface: Translucent Multiuser Interface for TeamWorkStation," ECSCW, Sep. 1991, pp. 6-10.

Hiroshi Ishii et al, "Toward an Open Shared Workspace: Computer and Video Fusion Approach of Team Workstation," Communications of the ACM, Dec. 1991, vol. 34 No. 12, pp. 37-50.

Hirotada Ueda et al, "Impact: An Interactive Natural-Motion-Picture Dedicated Multi-Media Authoring System," Communications of the ACM, Mar. 1991, pp. 343-350.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Installation Guide, "Getting Started 1" Manual, and Remote Control "Quick Reference Guide.".

Instruction Manual "Using StarSight 2" Published before Apr. 19, 1995.

Instructional Manual, "Sonic the Hedgehog," Sega of America, 1992.

James, A., "Oracle—Broadcasting the Written Word," Wireless World, Jul. 1973, vol. 79 No. 1453, pp. 314-316.

Judice, C.N., "Move Over Cable, Here Comes Video via Voice Lines," Network World, Sep. 1986, p. 26.

(56) References Cited

OTHER PUBLICATIONS

Kai et al "Development of a Simulation System for Integrated Services Television," Report from Information Processing Society of Japan, Japan, Sep. 13, 1996, vol. 96, No. 90 pgs.

Karstad, K., "Microprocessor Control for Color-TV Receivers," IEEE Transactions on Consumer Electronics, vol. CE-26, May 1980, pp. 149-155.

Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Listing of computer code for operating system within the Cable Computer in 1985 (Plaintiff's Exhibit 298).

Listing of computer code for Video HTU Program (Plaintiffs Exhibit 299).

Lowenstein, R.L. and Aller, H.E., "The Inevitable March of Videotex," Technology Review, vol. 88, Oct. 1985, p. 22.

M/A-COM, Inc., "Videocipher II Satellite Descrambler Owner's Manual," dated Prior Feb. 1986, pp. 1-17.

Mack Daily, "Addressable Decoder with Downloadable Operation," Proceedings from the Eleven Technical Sessions, 42nd Annual Convention and Exposition of the NCTA, Jun. 6-9, 1993, pp. 82-89.

Mannes, G., "Smart Screens: Development of Personal Navigation Systems for TV Viewers," Video Magazine, Dec. 1993.

Mar. 19, 1985 letter from G. Knapp of CableData to R. Hansen of Weststar Communications, Inc. (Plaintiff's Exhibit 325).

Markowitz, A. "Companies Jump on Interactive Bandwagon," Discount Store News, Dec. 6, 1993, pp. 4 and 131.

McKenzie, G.A., "Oracle—An Information Broadcasting Service Using Data Transmission in the Vertical Interval," Journal of the SMPTE, Jan. 1974, vol. 83 No. 1, pp. 6-10.

Merrell,R.G., "Tac Timer," 1986 NCTA Technical Papers, pp. 203-206.

Neumann, Andreas, "WDR Online Aufbau and Perspektiven Automatisierter Online-Dienste im WDR," RTM Rundfunktechnische Mitteilungen, vol. 41, pp. 56-66, Jun. 1997.

No subject, "Tom Schauer (tschauer@moscow.com)Thu, Sep. 28, 1995 16:46:48-700," XP-002378870 [Retrieved from the Internet Apr. 28, 2006].

Office Action dated Sep. 8, 2006 from U.S. Appl. No. 10/453,388.

Pfister, Larry T., "Teletext: Its Time Has Come," Prepared for the IGC Videotext / Teletext Conference, Andover, Massachusetts, Dec. 14, 1982, pp. 1-11.

Preview Guide Brochure, Spring 1984.

Preview Guide Brochure, Spring 1994.

Rayers, D.J., "Telesoftware by Teletext," 1984 IEEE Conference Papers, vol. 240, p. 323.

Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.

Roizen, Joseph "Teletext in the USA," Society of Motion Picture and Television Engineers Journal, Jul. 1981, pp. 602-610.

Roseville City Council Presentation, Mar. 13, 1985 (Defendant's Exhibit 226).

Ross Peddicord, New on TV: You Bet Your Horse,"*The Sun, Baltimore Maryland*" Dec. 15, 1994, 1 pg.

Schlender, B.R., "Couch Potatoes! Now Its Smart TV," Fortune, Nov. 20, 1989, pp. 111-116.

Schmuckler, Eric "A marriage that's made in cyberspace (television networks pursue links with online information services)," May 16, 1994 Mediaweek, v. 4, No. 20, p. 22(3).

Sealfon, Peggy, "High Tech TV," Photographic, Dec. 1984.

Sunada, K. et al, "Teletext Color Television Receiver Model C-29M950, C26M940," NEC Home Electronics , NEC Giho, 1987.

Sussman, A. "GTE Tunes in to Home TV Shopping," *PC Week*, Jun. 28, 1988, p. C15.

Tech Notes: Product Updates from M/A-Com Cable Home Group, "Videocipher Owners Manual Update," Issue No. 6, Feb. 1986.

Technical White Paper, "Open TV™ Operating Environment," ( © 1998 OpenTV Inc.), pp. 1-12.

Transcript of the Deposition of John Roop, Oct. 1996, pp. 186-187.

Trial testimony of *Michael Axford, Prevue Interactive, Inc. and United Video Satellite Group, Inc.* v. *Starsight Telecast, Inc.*, May 9, 1998, pp. 186-187, 295-315, and 352-357.

Various publications of Insight Telecast, 1992 and 1993.

Veith, R.H., "Television's Teletext," Elsevier Science Publishing Co., Inc, 1983, pp. 13-20, 41-51.

Videocipher Stipulation, May 1996.

VideoGuide, "VideoGuide Users Manual," pp. 1-27 (p. 11 is the most relevant).

W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.

Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.

Yee Hsiang Chang et al., "An Open-Systems Approach to Video on Demand," IEEE Communications Magazine, May 1994, pp. 68-80.

"A Financial Times Survey: Viewdata (Advertisement)," Financial Times, Mar. 20, 1979.

"Dialing the printed page," ITT in Europe Profile, 11/Spring 1977.

"Electronic Program Guide via Internet," Research Disclosure, Kenneth Mason Publications, Hampshire, GB Nr. 385 (May 1996) p. 276, ISSN:0374-4353.

"Growing US interest in the impact of viewdata," Computing Weekly, Jul. 20, 1978.

"Three men on a Viewdata bike," The Economist, Mar. 25, 1978.

"UVSG Offers System-Specific Web Site Development for OPS," press release of United Video Satellite Group, Apr. 12, 1996.

"UVSG Teams With Microsoft on Internet Information Server," press release of United Video Satellite Group, Feb. 22, 1996.

"Viewdata and its potential impact in the USA: Final Report/Volume One, The UK Experience," Link and Butler Cox & Partners Limited, Oct. 1978.

"Viewdata moves in US but GEC may lose out," Computing Weekly, Jan. 25, 1978.

"Viewdata Service Terminal Specification," British Post Office, Issue 5, Aug. 1978.

ACM Multimedia 93 Proceedings, A Digital On-Demand Video Service Suporting Content-Based Queries, Little et al. pp. 427-436, Jul. 1993.

Adrian Stokes, "The viewdata age: Power to the People," Computing Weekly, Jan. 1979.

Advertisement. Webster's II New Riverside University Dictionary. Houghton Mifflin Company, 1994.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

Baer, R.H., "Tele-Briefs: A Novel User-Selectable Real Time News Headline Service for Cable TV," IEEE Transactions on Consumer Electronics, vol. CE-25, No. 3, Jul. 1979, pp. 406-408.

Baer, R.H., "Innovative Add-On TV Products," IEEE Transactions on Consumer Electronics, vol. CE-25, No. 5, Nov. 1979, pp. 765-771.

Blahut et al., "Interactive Television," Proceedings of the IEEE, Jul. 1995.

D.C. Stickland, "Its a common noun," The Economist, Jun. 5, 1978.

DIRECTV Plus2 System, Thompson Consumer Electronics, Inc. (1999).

Gary D. Rosch, "New data and information system set for commercial market trial," Telephony, Mar. 20, 1978, at 96.

Gary L. Holland, "NAPLPS standard defines graphics and text communications," EDN, Jan. 10, 1985, at 179.

Hamid Qayyum, "Using IVDS and VBI for Interactive Television," IEEE, Jun. 10, 1996.

Hobbes Internet Timeline, Mar. 22, 2007.

(56) References Cited

OTHER PUBLICATIONS

Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230.
Instruction Manual "Using Star Sight," Copyright 1994 StarSight Telecast Inc.
International Search Report, International Application No. PCT/US97/23852, 01 Jun. 1998, 2 pages.
J.D. Mosley, "NAPLPS chip sets, though scarce, satisfy limited US videotex demand," EDN, Mar. 21, 1985, at 57.
James Poole, "Demand for Viewdata grows," Sunday Times, Feb. 10, 1977.
James Sorce, "Designing a broadband residential entertainment service: A case study," 13*th* International Symposium Human Factors in Telecommunications, Torino, Italy, Sep. 10-14, 1990.
Junko Yoshida, "Interactive TV a Blur," Electronic Engineering Times, Jan. 30, 1995.
Katharine Whitehorn, "Viewdata and you," Observer, Jul. 30, 1978.
Keith Lynch's timeline of net related terms and concepts,Mar. 22, 2007.
Kenneth Owen, "How dial-a-fact is coming closer to home," The Times, Sep. 30, 1977.
Kenneth Owen, "Why the Post Office is so excited by its plans for a TV screen information service," The Times, Sep. 26, 1976.
Larry Armstrong, "Channel-Surfing's next wave: Henry Yuen's interactive TV guide takes on TCI and Viacom," BusinessWeek, Jul. 31, 1995.
Margaret Ryan, "Interactive TV Takes a Corporte Twist," Electronic Engineering Times, Jul. 10, 1995.
Matthew D. Miller, "A Scenario for the Deployment of Interactive Multimedia Cable Television Systems in the United States in the 1990s," IEEE, 1994.
Other than. The American Heritage® Dictionary of Idioms by Christine Ammer. Houghton Mifflin Company, retrieved on Jul. 9, 2007. <Dictionary.com http://dictionary.reference.com/browse/other than>.
Periodical "Funkschau," vol. 6/96 of Mar. 1, 1996, pp. 1-9: "Multimedia Terminal as Terminal Device.".
Peter Large, "Throw away the books—Viewdata's coming," Guardian, Jan. 10, 1978.
Peter Large, "Viewdata, the invention that brings boundless advice and information to the home, also sets a test for the Post Office," Financial Guardian, Jun. 29, 1978.
Printout from Google News Archives, Mar. 22, 2007.
Rajapakshe et al., "Video on demand," (last modified Jun. 1995) <http://www-dse.doc.ic.ac.uk/~nd/suprise_95 /Journal/vol4/shr/report.html>.
Rath et al., "Set-Top Box Control Software: A Key Component in Digital Video," Philips Journal of Research, vol. 50, No. 1/2 1996, at 185.
Rebecca Day, "The Great PC/TV Debate," OEM Magazine, Jul. 1, 1996.
Rick Boyd-Merritt, "Television wires two-way video," Electronic Engineering Times, Apr. 25, 1994.
Ruffler et al., "InfoRadio on Demand, WebTV and digiTaz—Telecommerce Case Studies," May 23, 1996.
Schauer, Tom: Internet Article, [Online] Sep. 28, 1995, XP002378870, Retrieved from the Internet: URL: www.vision2020. moscow.com/Archives/1995/9509/0058.htlm> [retrieved on Sep. 28, 2006] *the whole document.

Selected pages from the "BBC Online—Schedules"web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the Prestel show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Steve A. Money, "Teletext and Viewdata," Butterworth & Co. Ltd., London, 1979.
Supplemental European Search Report, Application No. EP 97925449, Nov. 1999, 2 pages.
Supplementary European Search Report for Application No. EP 98 93 5889, completed on Sep. 28, 2001.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
VideoGuide, Videoguide Users Manual, pp. 1-27.
Web TV and Its Consumer Electronics Licensees debut First Internet Television Network and Set Top Box XP 002113265 Retrieved from the Internet: <URL http://www.webtv.net/company/news/archive/License.html> retrieved on Aug. 25, 1999.
Wikipedia article on CompuServe, Mar. 22, 2007.
William F. Arnold, "Britain to get wired city—via telephone," Electronics, Mar. 4, 1976, at 76.
U.S. Appl. No. 09/330,792, filed Jun. 11, 1999, Knudson et al.
U.S. Appl. No. 09/332,244, filed Jun. 11, 1999, Ellis et al.
U.S. Appl. No. 60/022,826, filed Jul. 26, 1999, Schein et al.
John Lloyd, "Impact of technology," Financial Times, Jul. 1978.
Other than. The American Heritage® Dictionary of Idioms by Christine Ammer Houghton Mifflin Company, retrieved on Jul. 9, 2007. <Dictionary.com http://dictionary.reference.com/browse/other than>.
Selected pages from the "BBC Online—Schedules" web page. This web page is located at http://www.bbc.co.uk/schedules/ (as printed from the Internet on Oct. 19, 1999 and being dated as early as May 24, 1997).
"Teletext presents the alternative view," Financial Times, Oct. 24, 1977.
"Starsight Interactive Television Program Guide IV'"; Jim Leftwich, Willy Lai & Steve Schein, Functional/Interactional Architecture Sepcification Document, Orbit Interaction, Palo Alto, California, Published before Apr. 19, 1995.

\* cited by examiner

INTERACTIVE ADVERTISING AND PROGRAM PROMOTION IN AN INTERACTIVE TELEVISION SYSTEM

BACKGROUND OF THE INVENTION

This invention relates to interactive television systems, and more particularly, to interactive television program guide systems having advertisements and program promotions that may attract and maintain user interest.

Interactive television systems may be used to provide an interactive television program guide in which program listings are presented to users. Pay-per-view and video-on-demand services, web browsing services, games, home shopping, and other interactive features may be provided using interactive television systems.

In known interactive television systems, a user has an in-home set-top box or other equipment with which the user can interact using a remote control or other user input interface. In a computer environment, the user can access interactive television program guide web sites.

Known interactive television systems provide interactive television program guides that display advertisements and program promotions alongside the program listings. However, known interactive television advertisements and program promotions struggle to attract and maintain user interest in advertisements and program promotions.

In view of the foregoing, it would be desirable to provide systems and methods for presenting interactive advertisements and program promotions that attract and maintain user attention and interest.

SUMMARY OF THE INVENTION

In accordance with the principles of the present invention, systems and methods are provided for presenting interactive advertisements and program promotions that attract and maintain user attention and interest.

Interactive advertisements may be displayed within interactive television application display screens, such as, an interactive television program guide display screen. An interactive advertisement may include an indication that interactive content or features will be presented upon the selection of the interactive advertisement. This indication may attract a user to the interactive advertisement. After the user selects the interactive advertisement, the user may be presented with interactive content or features that may maintain the user's interest in the advertisement.

The interactive content and features may relate to a product or service being advertised. Alternatively, the interactive content may be unrelated to the product or service being advertised.

In some embodiments, interactive channel advertisements may be interspersed within television program listings. When selected, the interactive channel advertisements may expand to provide interactive content or features to the user. These features may include providing television content or previews, providing information related to the advertisement or sponsor, setting television program reminders and recordings, setting television season reminders and recordings, etc.

In some embodiments, interactive advertisements may provide interactive features directly from interactive television application display screens. In other embodiments, interactive advertisements may only provide interactive features when selected. Some interactive advertisements may automatically provide television content or previews when selected. Interactive features may be provided while the television content is being displayed or after it is complete.

In yet another embodiment, interactive advertisements may be displayed over television programming. For example, an interactive advertisement overlay may be displayed while a displayed television program is paused, rewound, or fast-forwarded.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
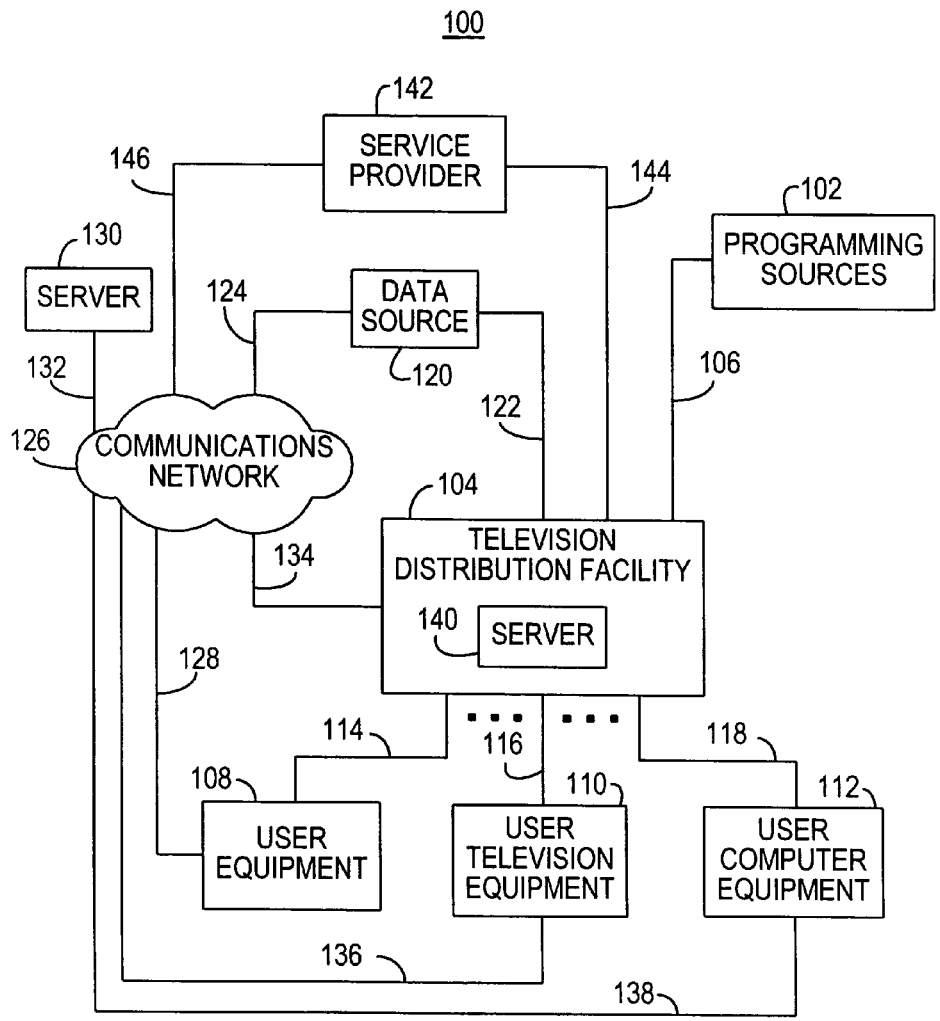
FIG. 1 is a diagram of an illustrative interactive television system in accordance with the present invention.

An illustrative interactive television system 100 in accordance with the present invention is shown in FIG. 1. Content such as television programming and digital music may be provided from programming sources 102 to television distribution facilities such as television distribution facility 104 using communications path 106. Programming sources 102 may be any suitable sources of television and music programming, such as television broadcasters (e.g., NBC, ABC, and HBO) or other television or music production studios. Programming sources 102 may provide television programming in a variety of formats in high definition and standard definition, such as, for example, 1080p, 1080i, 720p, 480p, 480i, and any other suitable format.

Television distribution facility 104 may be a cable system headend, a satellite television distribution facility, a television broadcaster, or any other suitable facility for distributing television and music programming to users. There are typically numerous television distribution facilities 104 in system 100, but only one is shown in FIG. 1 to avoid overcomplicating the drawing.

Communications path 106 may be a satellite path, a fiber-optic path, a cable path, or any other suitable wired or wireless communications path or combination of such paths.

Television distribution facility 104 may be connected to various user equipment devices 108. Such user equipment 108 may be located, for example, in the homes of users. User equipment 108 may include user television equipment 110 or user computer equipment 112. User equipment 108 may also include personal digital assistants (PDA), two-way pagers, cellular telephones, and other suitable devices.

The user equipment may receive television and music programming and other data from television distribution facility 104 over communications paths such as communications paths 114, 116, and 118. The user equipment may also transmit signals to television distribution facility 104 over paths 114, 116, and 118. Paths 114, 116, and 118 may be cables or other wired connections, free-space connections (e.g., for broadcast or other wireless signals), satellite links, or any other suitable link or combination of links.

Data source 120 in system 100 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), and information on actors and actresses. Data source 120 may also be used to provide advertisements (e.g., text, graphics, and video advertisements for various programs, products, services, and interactive television applications), real-time data such as sports scores, stock quotes, news data, and weather data, application data for one or more interactive television applications, and any other suitable data for use by system 100. For example, data source 120 may provide interactive advertising and program promotion data that may be displayed on user equipment associated with an interactive television system.

There may be multiple data sources such as data source 120 in system 100, although only one is shown in FIG. 1 to avoid overcomplicating the drawing. For example, a separate data source 120 may be associated with each of a plurality of television broadcasters and may provide data that is specific to those broadcasters (e.g., advertisements for future programming of the broadcasters, logo data for displaying broadcasters' logos in program guide display screens, etc.). Data source 120 and the other system components of FIG. 1 may be provided using equipment at one or more locations. Systems components are drawn as single boxes in FIG. 1 to avoid overcomplicating the drawings.

In some embodiments of the present invention, data source 120 may provide program schedule data and other data to television distribution facility 104 over communications path 122 for distribution to the associated user equipment over paths 114, 116, and 118 (e.g., when data source 120 is located at a main facility). Communications path 122 may be any suitable communications path, such as a satellite communications path or other wireless path, a fiber-optic or other wired communications path, a path that supports Internet communications, or other suitable path or combination of such paths.

In some embodiments of the present invention, data source 120 may provide program schedule data and other data directly to user equipment 108 over path 124, communications network 126, and path 128 (e.g., when data source 120 is located at a facility such as one of programming sources 102). Paths 124 and 128 may be wired paths such as a telephone lines, cable paths, fiber-optic paths, satellite paths, wireless paths, any other suitable paths or a combinations of such paths. Communications network 126 may be any suitable communications network, such as the Internet, the public switched telephone network, or a packet-based network.

Program schedule data and other interactive television data may be provided to user equipment using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

User equipment devices such as user television equipment and personal computers may use the program schedule data and other interactive television data to display program listings and other information (e.g., information on digital music) for the user. An interactive television program guide application or other suitable interactive television application may be used to display the information on the user's display (e.g., in one or more overlays that are displayed on top of video for a given television channel). Interactive television displays may be generated and displayed for the user using any suitable approach. In one suitable approach, television distribution facility 104 or other facility may generate application display screens and may transmit the display screens to user equipment for display. In another suitable approach, user equipment may store data for use in one or more interactive television displays (e.g., program schedule data, advertisements, logos, etc.), and an interactive television application implemented at least partially on the user equipment may generate the interactive television displays based on instructions received from television distribution facility 104 or other facility. In some embodiments of the present invention, user equipment may store only the program schedule data and other data that is used to generate the interactive television displays (e.g., storing logo data for a particular television broadcaster only if the logo is to be included in one or more interactive television displays). In some embodiments of the present invention, user equipment may store various program schedule data and other data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive television overlays for the user.

An on-line program guide and other interactive television services may be provided using a server connected to communications network 126 such as server 130. Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths.

User equipment 108 may access on-line program guide data and other data from server 130 via communications path 128. User equipment 108 may also access the on-line program guide and other services on server 130 via communications path 114, television distribution facility 104, and communications path 134. For example, a cable modem or other suitable equipment may be used by user equipment 108 to communicate with television distribution facility 104. Television distribution facility 104 may communicate with communications network 126 over any suitable path 134, such as a wired path, a cable path, fiber-optic path, satellite path, wireless paths, or combination of such paths.

User equipment such as user television equipment 110 and user computer equipment 112 may access the on-line program guide and server 130 using similar arrangements. User television equipment 110 may access the on-line program guide and server 130 using communications path 136 or using path 116, television distribution facility 104, and path 134. User computer equipment 112 may access the on-line program guide and server 130 using communications path 138 or using path 118, television distribution facility 104, and path 134. Paths 136 and 138 may be any suitable paths such as wired paths, cable paths, fiber-optic paths, wireless paths, satellite paths, or a combination of such paths.

Program guide application functions and the functions of other interactive television applications may be supported using server 130 and other servers connected to communications network 126 such as server 140. Interactive television applications may also be supported by servers or other suitable equipment at one or more service providers such as service provider 142. For example, a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via television distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

Another example of an interactive television application is a home banking application. A home banking service may be supported using personnel at facilities such as service provider 142. An interactive home banking application that is implemented using the user equipment may access the home banking service via television distribution facility 104 and communications path 144 or via communications network 126 and communications path 146.

If desired, an interactive television application such as a network-based video recorder or a video-on-demand application may be supported using server 140, server 130, or equipment at service provider 142. Video-on-demand content and video recorded using a network-based video recorder arrangement may be stored on server 140 or server 130 or at service provider 142 and may be provided to the user equipment when requested by users. An interactive television application may be used to support the functions of a personal video recorder (sometimes called a digital video recorder) that is implemented using user equipment 108. Illustrative equipment that may be used to support personal video recorder functions include specialized personal video recorder devices, integrated receiver decoders (IRDs), set-top boxes with integrated or external hard drives, or personal computers with video recording capabilities.

If desired, interactive television applications such as an interactive television program guide application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications. These applications may display on user equipment various overlays including interactive television information on top of video for a given television channel.

The interactive television program guide application, the home banking application, the home shopping application, the network-based video recorder and personal video recorder applications, the video-on-demand application, the gaming applications, communications applications, and navigational applications are only a few illustrative examples of the types of interactive television applications that may be supported by system 100. Other suitable applications that may be supported include news services, web browsing and other Internet services, and interactive wagering services (e.g., for wagering on horse races, sporting events, and the like).

The interactive television application or applications that are used in interactive television system 100 may be implemented locally on the user equipment. The applications may also be implemented in a distributed fashion (e.g., using a client-server architecture in which the user equipment serves at least partly and for at least some of the time as the client and a server such as server 140 at television distribution facility 104, server 130, or other suitable equipment acts as the server). Other distributed architectures may also be used if desired. Moreover, some or all of the interactive television system features of system 100 may be provided using operating system software or middleware software. Such operating system software and middleware may be used instead of or in combination with application-level software. Regardless of the particular arrangement used to implement interactive television features related to, for example, program guides, home shopping, home banking, video-on-demand, Internet, and communications, the software that supports these features may be referred to as an application or applications.

Figure 2:
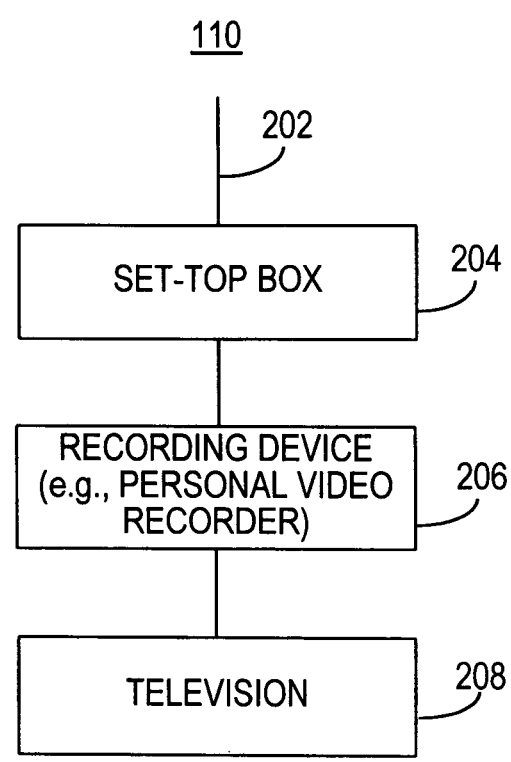
FIG. 2 is a diagram of illustrative user television equipment in accordance with the present invention.

Illustrative user television equipment 110 (FIG. 1) that is based on a set-top box arrangement is shown in FIG. 2. Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive television or other data may be received using input/output 202. Commands and requests and other data generated as a result of user interactions with the interactive television application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Both analog and digital channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content. Box 204 may include a storage device (e.g., a digital storage device such as a hard disk drive) for providing recording capabilities. Box 204 may also be connected to a recording device 206 such as a video cassette recorder, personal video recorder, or other device or devices with storage capabilities.

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or videocassette recorder).

Recording device 206 may be used to record videos provided by set-top box 204. For example, if set-top box 204 is tuned to a given television channel, the video signal for that television channel may be passed to recording device 206 for recording on a videocassette, compact disc, digital video disk, or internal hard drive or other storage device. Recording device 206 may have communications circuitry such as a cable modem, an ISDN modem, a DSL modem, a wireless modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. If desired, multiple recording devices 206 or no recording device 206 may be used. If recording device 206 is not present or is not being actively used, the video signals from set-top box 204 may be provided directly to television 208. Any suitable television or monitor may be used to display the video. In the equipment of FIG. 2 and the other equipment of system 100 (FIG. 1), the audio associated with various video items is typically distributed with those video items and is generally played back to the user as the videos are played.

Figure 3:
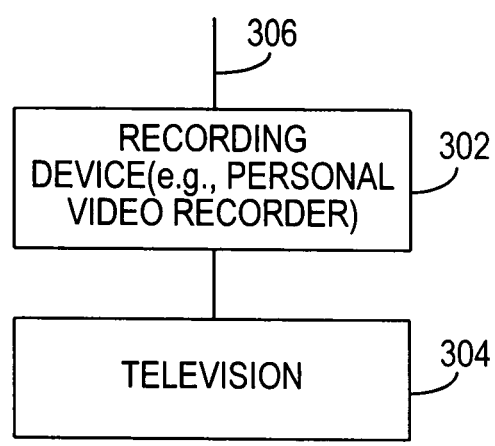
FIG. 3 is a diagram of additional illustrative user television equipment in accordance with the present invention.

Another illustrative arrangement for user television equipment 110 (FIG. 1) is shown in FIG. 3. In the example of FIG. 3, user television equipment 110 includes a recording device 302 such as a digital video recorder (e.g., a personal video recorder (PVR)) that uses a hard disk or other storage for recording video or may be a digital video disc recorder, compact disc recorder, videocassette recorder, or other suitable recording device. Equipment 110 of FIG. 3 may also include a television 304. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive program guide data and other data) and multiple tuners may be provided. Recording device 302 may also contain digital decoding circuitry for receiving digital television programming, music programming, program guide data, and other data on one or more digital channels. If desired, recording device 302 may contain circuitry for handling both analog and digital channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned.

Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3 or recording device 206 of FIG. 2 may record new video while previously recorded video is being played back on television 304 or 208. This allows users to press a pause button during normal television viewing. When the pause button is pressed, the current television program is stored on the hard disk of digital video recorder 302. When the user presses play, the recorded video may be played back. This arrangement allows the user to seamlessly pause and resume television viewing. Recording device 302 and 206 may also be used to allow a user to watch a previously-recorded program while simultaneously recording a new program.

The set-top box arrangement of FIG. 2 and the personal video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 204, recording device 302, a WebTV box, or PC/TV or the like may be integrated into a television, personal computer, PDA, cellular telephone, two-way pager or other suitable device.

Figure 4:
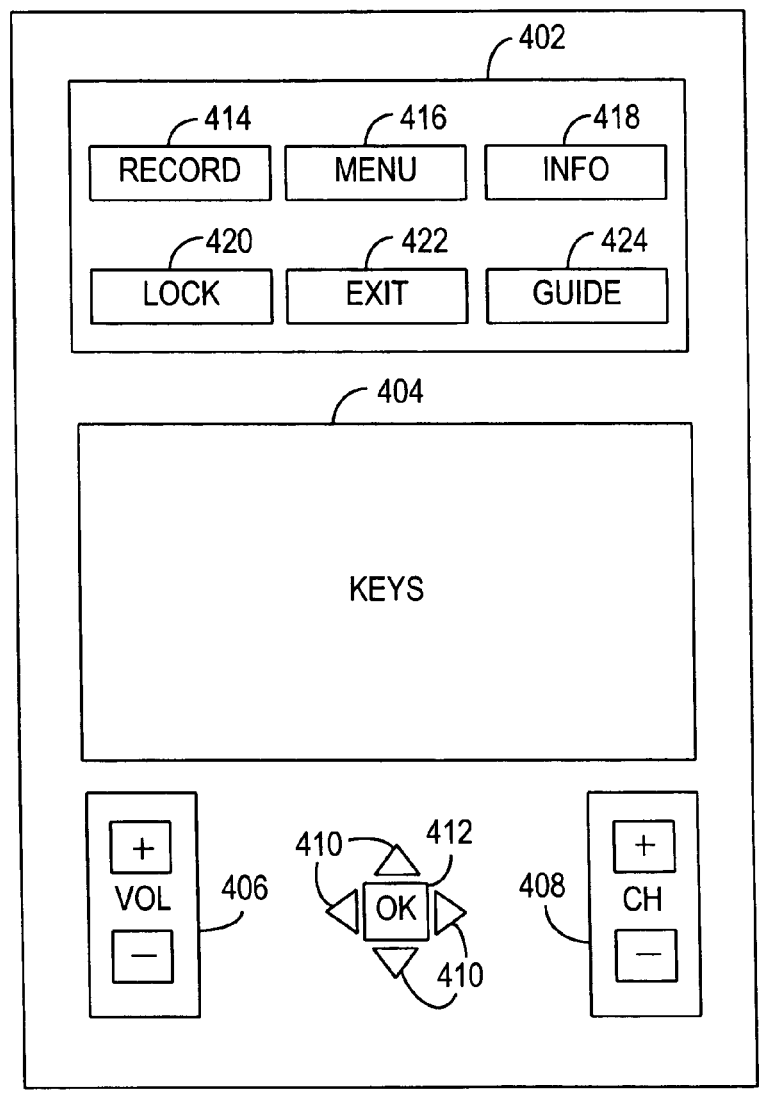
FIG. 4 is a diagram of an illustrative remote control in accordance with the present invention.

An illustrative remote control 400 for operating user television equipment 110 (FIG. 1) or suitable user computer equipment 112 is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change television channels and to access content on virtual channels. Cursor keys 410 may be used to navigate on-screen menus. For example, cursor keys 410 may be used to position an on-screen cursor, indicator, or highlight (sometimes all generically referred to herein as a highlight or highlight region) to indicate interest in a particular option or other item on a display screen that is displayed by the interactive television application.

An OK key 412 (sometimes called a select or enter key) may be used to select on-screen options that the user has highlighted.

Keys 402 may include a RECORD key 414 for initiating recordings. MENU button 416 may be used to direct the interactive television application to display a menu on the user's display screen (e.g., on television 208 or 304 or on a suitable monitor or computer display). INFO button 418 may be used to direct the interactive television application to display an information display screen. For example, when a user presses INFO key 418 while video for a given television channel is displayed for the user, the interactive television application may display a FLIP overlay including program schedule information for the current program on the given television channel on top of the video. As another example, when a particular program listing in an interactive television program listings display screen is highlighted, the user pressing INFO button 418 may cause the interactive television application to provide additional program schedule information associated with that program listing (e.g., a program description, actor information, etc.).

LOCK button 420 may be used to modify access privileges. For example, a parent may use LOCK button 420 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on, for example, rating, channel, and program title. A locked or blocked program is typically not viewable until the interactive television application is provided with a suitable personal identification number (PIN). Once this PIN has been entered, the interactive television program will unlock the user's equipment and allow the locked content to be accessed.

EXIT button 422 may be used to exit the interactive television application or to exit a portion of the interactive television application (e.g., to cause the interactive television application to remove a FLIP, BROWSE, or other interactive television overlay from the display screen). GUIDE button 424 may be used to invoke an interactive television program guide (e.g., a program guide menu screen, program listings screen, or other program guide screen).

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
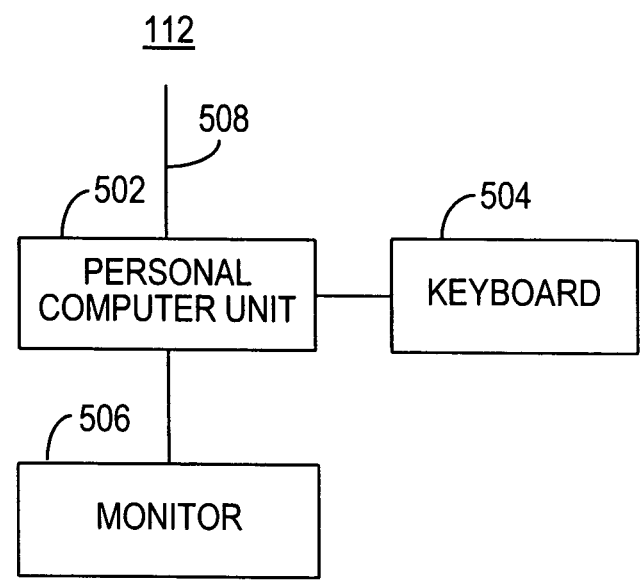
FIG. 5 is a diagram of illustrative user computer equipment in accordance with the present invention.

Illustrative user computer equipment 112 (FIG. 1) is shown in FIG. 5. In the arrangement of FIG. 5, personal computer 502 may be controlled by the user using keyboard 504 or other suitable user input device such as a trackball, mouse, touch pad, touch screen, voice recognition system, or a remote control such as remote control 400 of FIG. 4. Video content such as television programming and interactive television application display screens may be displayed on monitor 506. Television and music programming, program guide data, video-on-demand content, video recordings played back from a network-based video recorder, and other data may be received from paths 118 and 138 (FIG. 1) using input/output 508. User commands and other information generated as a result of user interactions with the interactive television application and system 100 (FIG. 1) may also be transmitted over input/output 508.

Personal computer unit 502 may contain a television or video card such as a television tuner card for decoding analog and digital television channels (e.g., channels comprising program guide data) and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 502 may be used to handle video and other content delivered via input/output line 508 if desired.

Personal computer unit 502 may contain one or more processors (e.g., microprocessors) that are used to run the interactive television application or a portion of the interactive television application.

Personal computer unit 502 may include a hard drive, DVD drive, CD drive, or other suitable storage device or devices that stores video, program guide data, and other content. The interactive television application and personal computer unit 502 may use a storage device or devices to, for example, provide the functions of a personal video recorder.

User equipment such as user equipment 108, user television equipment 110, and user computer equipment 112 may be used with network equipment such as server 130, server 140, and equipment at service providers such as service provider 142 of FIG. 1 to provide network-based video recording functions. Video recording functions may be provided by storing copies of television programs and other video content on a remote server (e.g., server 130 or server 140) or other network-based equipment such as equipment at a service provider such as service provider 142.

Video recordings may be made in response to user commands that are entered at user equipment 108. In a personal video recorder arrangement, the interactive television application may be used to record video locally on the user equipment in response to the user commands. In a network-based video recorder arrangement, the interactive television application may be used to record video or to make virtual recordings on network equipment such as server 130, server 140, or equipment at service provider 142 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network. For example, data associated with the display of interactive television overlays that have been customized by the user may be stored in such an area (e.g., to allow a back office of the interactive television application to determine which types of interactive television data are most desirable to users).

Figure 6:
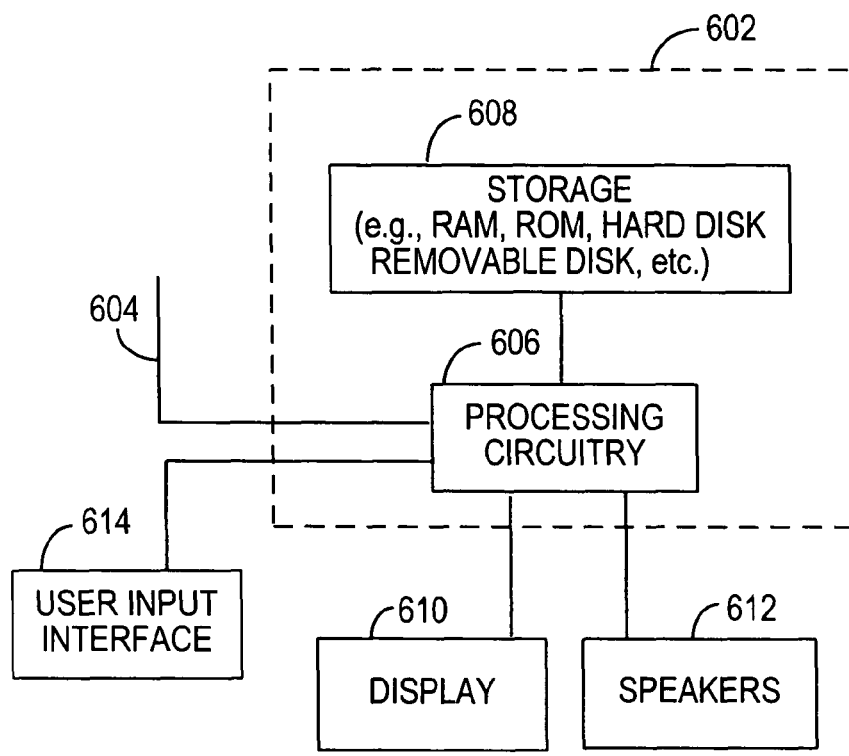
FIG. 6 is a generalized diagram of illustrative user equipment in accordance with the present invention.

The user television equipment and user computer equipment arrangements described above are merely illustrative. A more generalized embodiment of illustrative user equipment 108, 110, and 112 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Television and music programming may be received via input/output 604 (e.g., from programming sources 102, servers or other equipment such as server 130, service providers such as service provider 142, television distribution facility 104, etc.). Program schedule information for an interactive television program guide may be received from data source 120 via input/output 604. Input/output 604 may also be used to receive data from data source 120 for other interactive television applications. The user may use control circuitry 602 to send commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 608 that is part of control circuitry 602. Tuning circuitry such as one or more analog tuners, one or more MPEG-2 decoders or other digital video circuitry, or any other suitable tuning or video circuits or combinations of such circuits may also be included as part of circuitry 602. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. Speakers 612 may be provided as part of a television or may be stand-alone units. Digital music and the audio component of videos displayed on display 610 may be played through speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

The interactive television application of the present invention may use application data to change its display screens and available options. Such application data may originate from computers located at one or more suitable facilities or locations (e.g., television distribution facility 104 (FIG. 1), one or more data sources 120 (FIG. 1), a user input interface at user equipment, etc.). FIGS. 7-20 show illustrative interactive television application display screens in accordance with various embodiments of the present invention.

In some embodiments of the present invention, the interactive television application (e.g., an interactive television program guide) may display interactive advertisements and program promotions that may attract and maintain user interest. In addition to using text, graphics, and video to advertise products, services, programs, and interactive television applications, interactive advertisements may further provide interactive content or interactive services that may be related or unrelated to the advertised product or service. The interactive content or services may entice the user to view and interact with the interactive advertisements.

Figure 7:
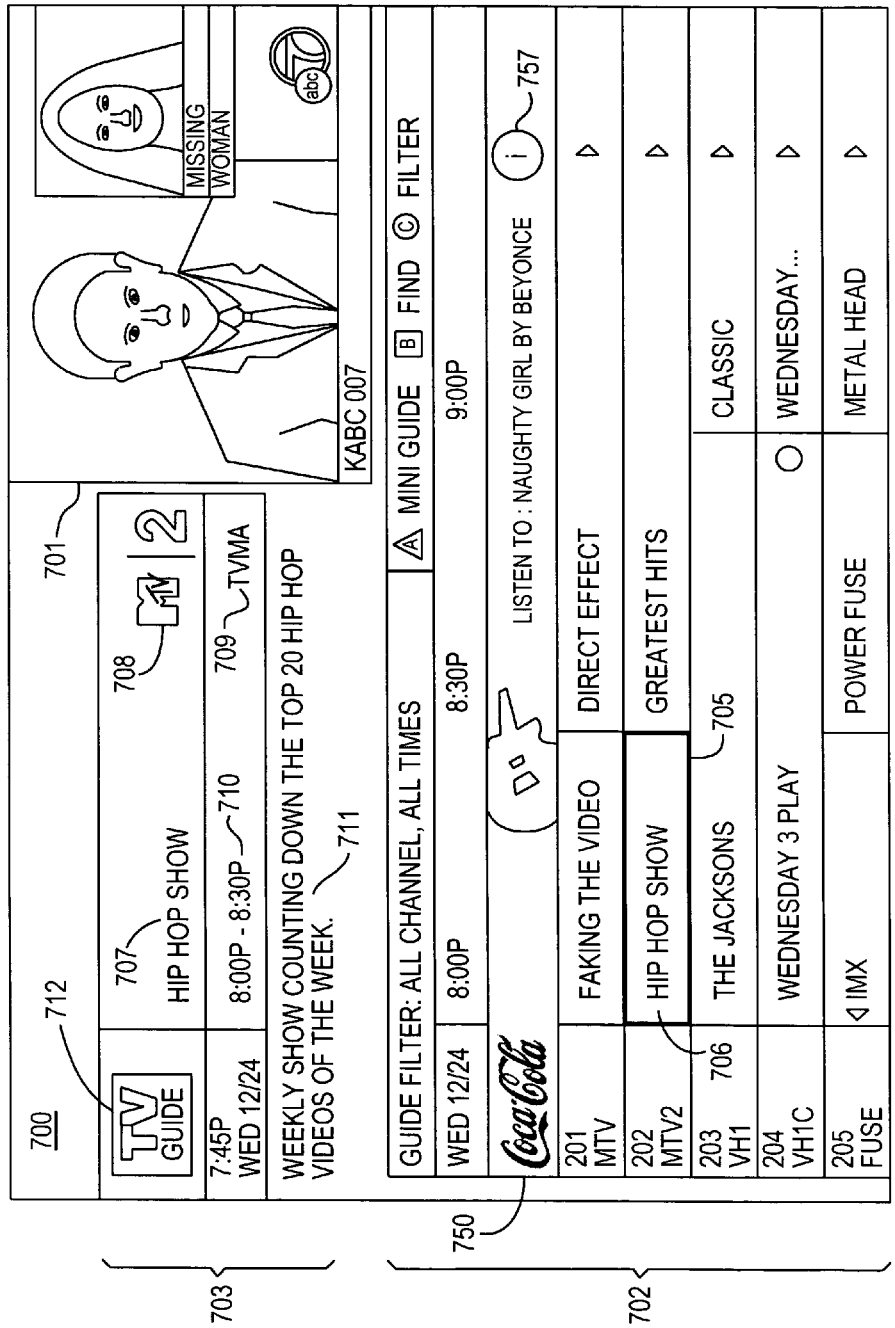
FIG. 7 shows an illustrative interactive television application display screen having an interactive channel advertisement in accordance with the present invention.
Figure 8:
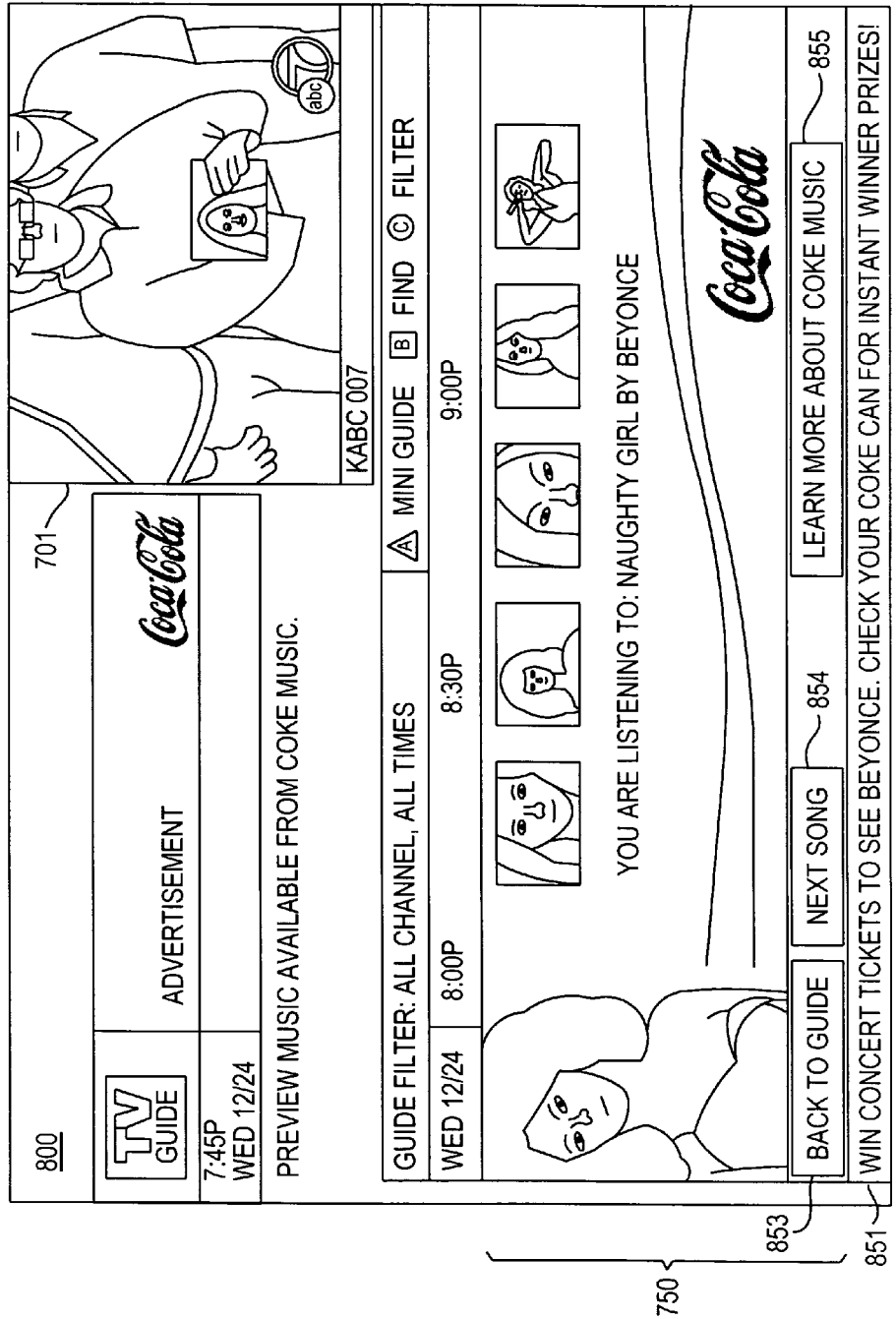
FIG. 8 shows an illustrative interactive television application display screen having an expanded interactive channel advertisement in accordance with the present invention.

An illustrative interactive advertisement that is displayed in an interactive television program guide display screen 700 is shown in FIG. 7. Display screen 700 is an interactive television program guide display screen that may occupy the full area of a user's display (e.g., television 208 (FIG. 2), television 304 (FIG. 3), monitor 506 (FIG. 5), display 610 (FIG. 6), etc.). Program guide display screen 700 may be displayed, for example, when the user selects a program listings option, when the user selects a suitable option from within an interactive television program guide or other interactive television application, or when the user presses an appropriate remote control button such as guide button 424 (FIG. 4) or otherwise uses user input interface 614 (FIG. 6) to indicate a desire to view program listings.

Display screen 700 includes a picture-in-picture (PIP) window 701 that may display television programming. Audio for the video displayed in PIP window 701 may or may not be audible to the user while program listings display screen 700 is displayed by user equipment. In another embodiment of the present invention, PIP window 701 may contain video, animations, or images containing advertisements or promotional information. In some embodiments, selecting or highlighting an advertisement in the interactive program guide may replace the video in PIP window 701 with advertising content.

Display screen 700 also includes grid guide 702 and information region 703. Grid guide 702 may contain a grid or list of program listings, such as, program listing 705. The program listings may include program titles, channels, scheduled broadcast times, and any other suitable program schedule information. Highlight region 706 may be used to select a desired program listing. Program information for highlighted programs may appear elsewhere on program display screen 700 (e.g., in program information region 703).

Program information region 703 may include program schedule information, such as, program title 707, channel number and logo 708, program rating 709, program run time 710, and program description 711 for the television program that is currently selected with highlight region 706.

Program listings display screen 700 may also include service provider logo 712 (e.g., an MSO logo). The user may change the position of highlight region 706 using, for example, remote control 400 (FIG. 4) or other user input interface (e.g., user input interface 614 (FIG. 6)) to view detailed program information for other program listings.

Interactive program guide display screen 700 of FIG. 7 is only illustrative. Any other suitable interactive television application display screen may be displayed by the interactive television system in accordance with the present invention.

In addition to program schedule information, program listings display screen 700 may also include interactive advertisements and program promotions, such as, interactive channel advertisement 750. Interactive channel advertisement 750 is displayed within grid guide 702 and may be interspersed with the program listings. Channel advertisement 750 may, for example, promote a current or future television program, may advertise a product or service, or may provide the user with additional content. Further, interactive channel advertisement 750 may provide interactive content or features that may attract or maintain user interest in the advertisement and that may be related or unrelated to the product or service being advertised.

For example, interactive channel advertisement 750, sponsored by Coca-Cola Music (™), provides the user with the opportunity to listen to the song "Naughty Girl" by Beyonce. According to the present example, providing interactive content (i.e., access to music) may attract and maintain user interest in the content and sponsor of the advertisement (i.e., Coca-Cola (™).

According the present example, interactive television advertisement 750 advertises Coca-Cola (™) while providing interactive content that plays music by Beyonce. This interactive content is unrelated to the advertised product. Coca-Cola (™), the sponsor of interactive channel advertisement 750, may use the interactive content to attract and maintain user interest in the advertisement. In addition to the unrelated interactive content, interactive channel advertisement may also provide content related to the advertised product, such as information related to Coca-Cola (™) products.

Interactive content logo 757 may indicate the availability of interactive content associated with interactive channel advertisement 750. Further, interactive channel advertisement 750 may be distinguished from the program listings in grid guide 702 by being displayed with a unique color or graphic scheme (e.g., the Coca-Cola Music (™) graphical banner). Any other means of attracting user attention or interest in the interactive channel advertisement may be used in accordance with the invention.

The user may change the position of highlight region 706 to view more information about interactive channel advertisement 750. Information about the interactive channel advertisement, the subject of the advertisement or promotion, and the nature of the interactive content may be displayed in program information region 703. The user may select an interactive channel advertisement, for example, by using remote control 400 (FIG. 4) or other user input interface (e.g., user input interface 614 (FIG. 6)). Selecting an interactive channel advertisement may provide the user with additional information and interactive features related to the advertisement or promotion. Where the channel advertisement is associated with content (e.g., television programming, an interactive television application, a special feature, etc.), selecting the advertisement may direct the television system to access the content. When the content is not presently available, the system may be scheduled to record the content or may set a reminder for when the content is available at a later time. For example, selecting interactive channel advertisement 750 may cause the interactive television application to display illustrative display screen 800 shown in FIG. 8.

In display screen 800, interactive channel advertisement 750 has expanded to cover the program listings shown in grid guide 702 (FIG. 7). The expansion of interactive channel advertisement 750 may be accompanied by sound or animation to enhance the visual effect of interactive channel advertisement 750. Further, audio for the video displayed in PIP window 701 may be muted and replaced with audio associated with the interactive channel advertisement. According to the present example, the song "Naughty Girl" may be played. In some embodiments the video in PIP window 701 may also be replaced with video or other visual content associated with the interactive advertisement. For example, PIP window 701 may be replaced with the music video associated with the song being played. As another example, PIP window 701 may be replaced with video associated with the sponsor of the advertisement, Coca-Cola (™). As yet another example, PIP window may be replaced with images related to Beyonce, such as pictures of Beyonce or cover art related to the song "Naughty Girl," or images related to the sponsor. The expanded area of expanded interactive channel advertisement 750 may also contain video, images, animations, or other content related to the interactive content or sponsor of interactive channel advertisement 750.

Expanded interactive channel advertisement 750 may also contain user navigable and selectable options. For example, option 853 may shrink expanded interactive channel advertisement 750 and return the user to the program guide display. Option 854 may play another song. The other song may be from the same album as original song or may be from the same artist. Alternatively, the other song may be unrelated to the current song. The visual content, such as the images and text of expanded interactive channel advertisement 750 may change to reflect the new song. Option 855 may provide more information about the sponsor of the advertisement (i.e., Coca-Cola Music (™)). This information may be provided within or over the expanded channel advertisement area or may be displayed in a new display screen. Expanded interactive channel advertisement 750 may also contain text bar 851 that may display textual information associated with the advertisement.

Other selectable options may also be provided within expanded interactive channel advertisement 750. For example, selectable options may allow the user to select a new song to be played from a list of songs, albums, artists, or genres. If a large selection of songs is available, the selectable option may contain a scroll or drop-down list or may allow a user to search available songs. Further, the selection of songs provided may be customized based on the user's interests which may be determined by collecting information submitted by the user, by monitoring the user's interactions with the user equipment, or by any suitable means.

Another selectable option may allow the user to record or download the selected song. The selected song may be provided to the user free of charge (e.g., as a promotion by the sponsor of the advertisement). Alternatively, the user may be required to pay a fee in order to download or record the selected song. For example, in response to selecting the option to download the song, the user may be alerted to the fee and prompted to confirm the request to download the song. The fee may be automatically charged to an account of the user or the user may be required to provide payment information.

After the download of the selected song is authorized, the song may be recorded or downloaded directly from the interactive television system (e.g., using recording equipment, such as recording device 206 (FIG. 2) or 302 (FIG. 3)). Alternatively, the selectable option may authorize the user to download the selected song to other suitable user equipment (e.g., a portable media player, such as an iPod (™) or other suitable device). In some embodiments, the portable media player may connect to the interactive television system to receive the selected song. In other embodiments, the selected song may be transferred to the portable media player using standard techniques, such as transferring the selected song to a personal computer which may then transfer the selected song to the portable media player. In yet another embodiment, the interactive television system may authorize the download of the song through an online music store. For example, the interactive television system may display an access code for use on the online music store. The user may then login to the online music store and provide the access code in order to download the song.

Figure 9:
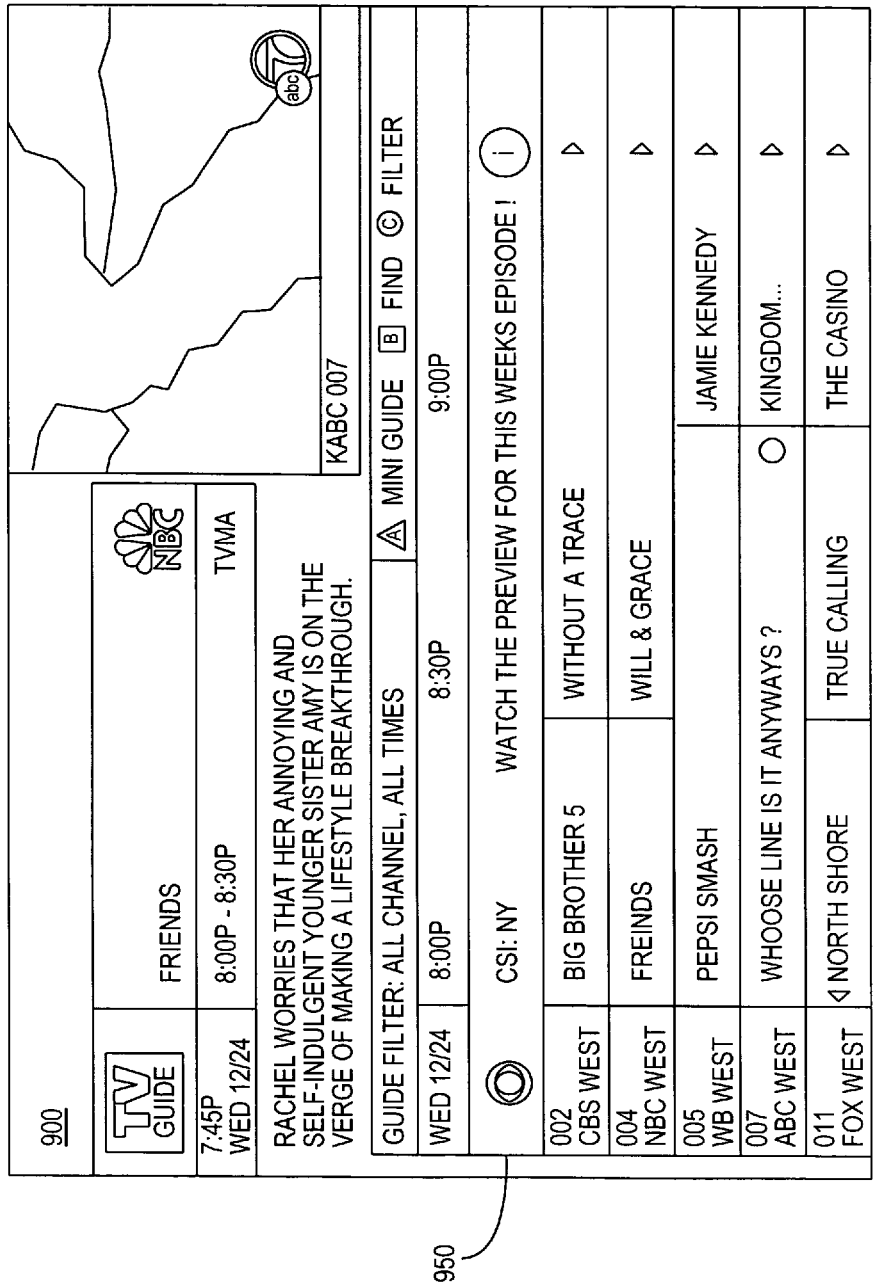
FIG. 9 shows another illustrative interactive television application display screen having an interactive channel advertisement in accordance with the present invention.

Another illustrative interactive television display screen 900 having an interactive channel advertisement is shown in FIG. 9. Display screen 900 contains interactive channel advertisement 950 that promotes the CBS television series "CSI:NY". Interactive channel advertisement 950 contains the CBS logo, the title of the television series "CSI:NY," and offers the user the ability to watch a preview of the upcoming episode.

Selecting channel advertisement 950 may cause a preview of the upcoming television episode to be displayed on the television display. The preview may be displayed using a video-on-demand application, may be accessed from a network-based video recorder, or may be provided to the user equipment from server 130, server 140, or from equipment at service provider 142 (FIG. 1). Alternatively, previously saved content may be accessed from user video recording equipment, such as recording device 206 (FIG. 2) or 302 (FIG. 3). In some embodiments the preview may be displayed on the full television display. In another embodiment the preview may be displayed in a PIP window. While the preview is being displayed, a window may be overlaid on a portion of the display. The overlay window may provide information related to previewed television program and may provide user selectable options (e.g., return to program guide).

Figure 10:
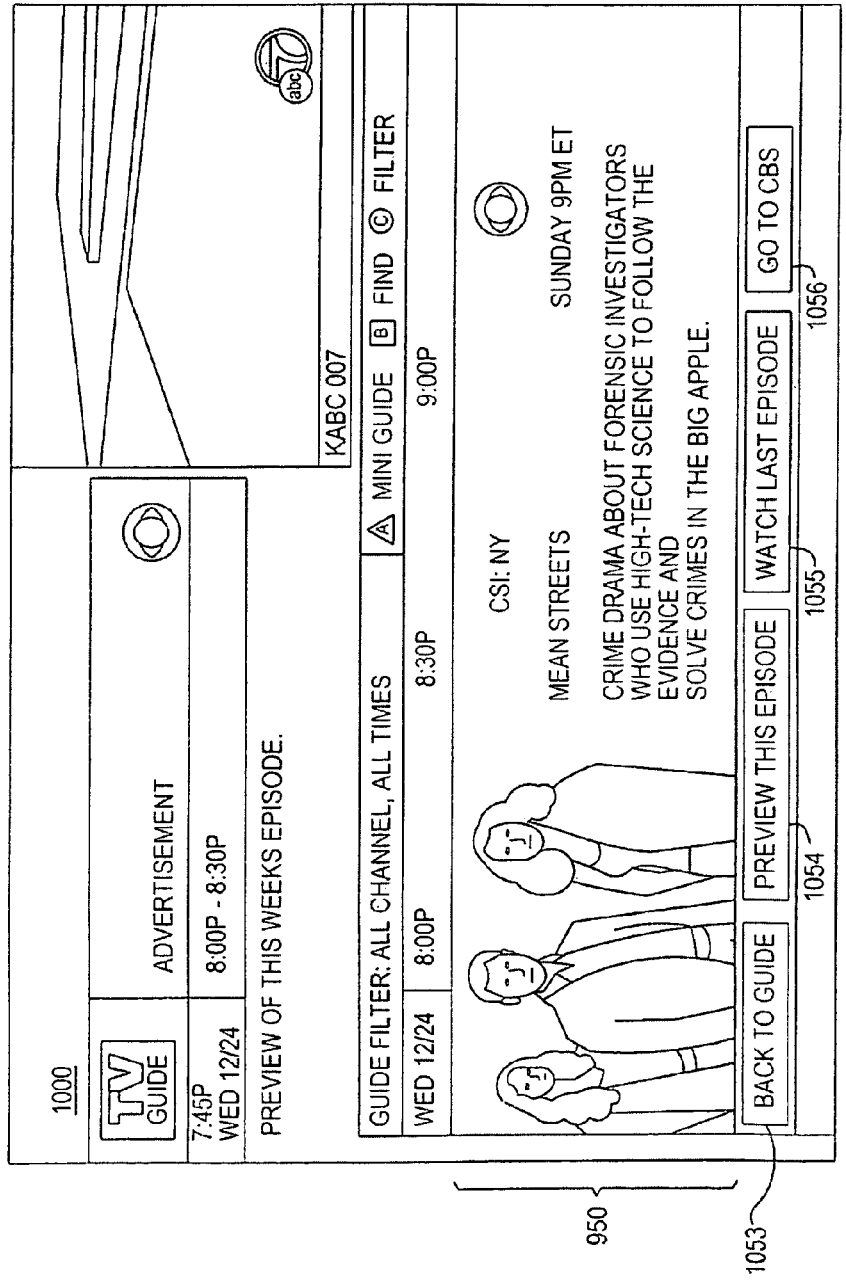
FIG. 10 shows another illustrative interactive television application display screen having an expanded interactive channel advertisement in accordance with the present invention.

Illustrative expanded interactive channel advertisement 950, in display screen 1000, is shown in FIG. 10. Expanded interactive channel advertisement 950 may be displayed after the preview. Alternatively, expanded channel advertisement 950 may be displayed prior to displaying the preview. Like expanded interactive channel advertisement 750, expanded interactive channel advertisement 950 may contain selectable options. Option 1053 may exit the expanded channel advertisement and return to the interactive television program guide display, option 1054 may display the preview for the upcoming episode, option 1055 may display the last episode, and option 1056 may tune the interactive television system to CBS.

If a user selects option 1055, the last episode may be displayed using a video-on-demand application or a network-based video recorder, may be provided to the user equipment from server 130, server 140, or from equipment at service provider 142 (FIG. 1), or may be accessed from user video recording equipment, such as recording device 206 (FIG. 2) or 302 (FIG. 3). The interactive television program guide may determine if the last episode is available from at least one source and may select the source based on that determination. This determination may be made before or after the selection of option 1055. Further options may allow the user to display other previous episodes of the television series.

According to some embodiments, accessing previous episodes may require access to network-based video recorder services, video-on-demand subscriptions, or personal recordings of the episodes. In some embodiments, the interactive television program guide may determine if the user has access to personal or network-based recordings of previous episodes and may allow access to these episodes through interactive channel advertisement 950. If the interactive television program guide determines that the user does not have access to a selected episode, the interactive television program guide may provide the user with the option to obtain access to the selected episode. In some embodiments, the user may be required to pay an additional fee to access the selected episodes. Further, the ability to access past episodes may depend on the service provider, the television equipment of the user, or the subscription level of the user.

Further options that may be provided within expanded interactive channel advertisement 950 may include, for example, options that may set reminders or recording options for upcoming episodes or for an entire season. Setting recording options may cause user video recording equipment, such as recording device 206 (FIG. 2) or 302 (FIG. 3) or network-based video recorder services to record the selected episodes.

Alternatively, setting a recoding option for upcoming schedules may provide the user with access to the episode via a video-on-demand subscription or via a network-based video recorder service.

Figure 11:
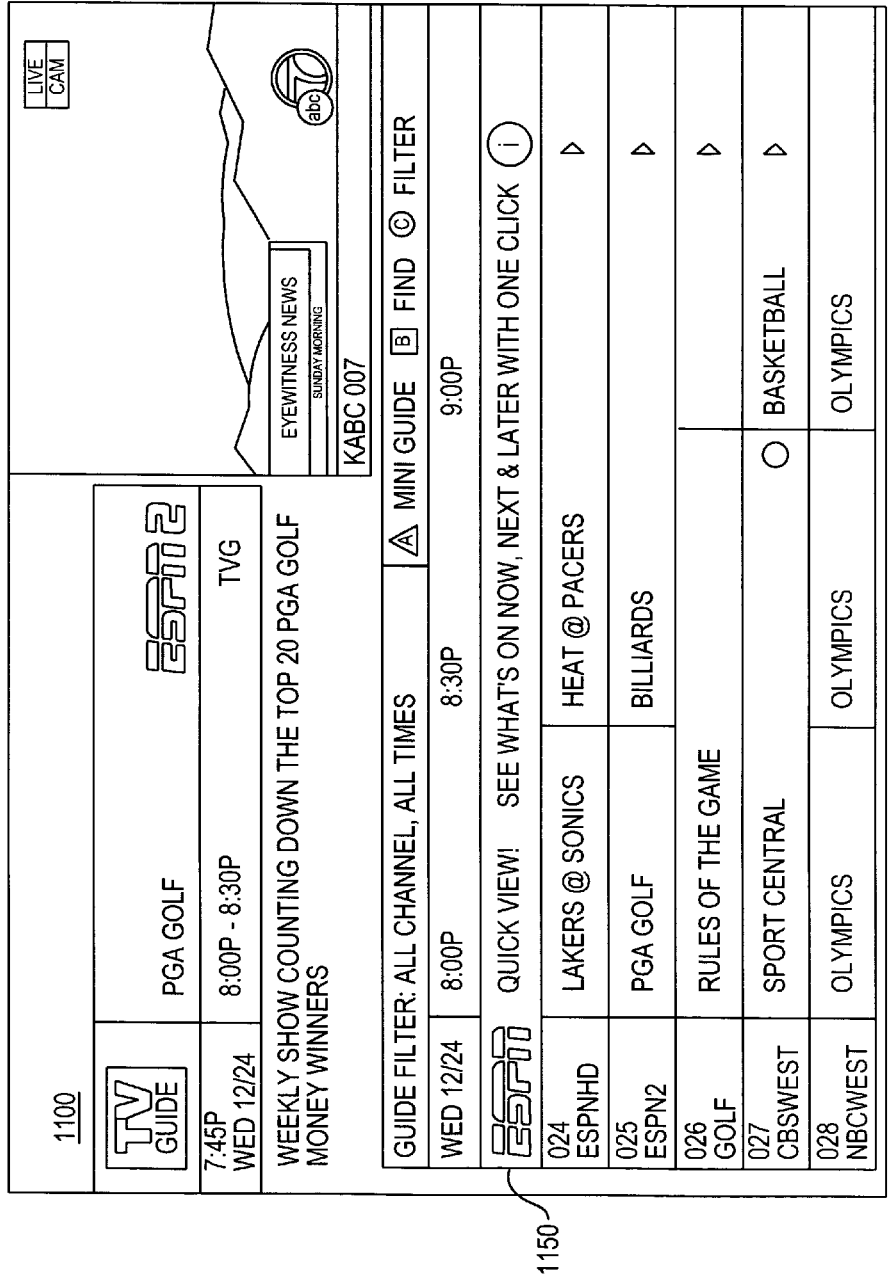
FIG. 11 shows yet another illustrative interactive television application display screen having an interactive channel advertisement in accordance with the present invention.
Figure 12:
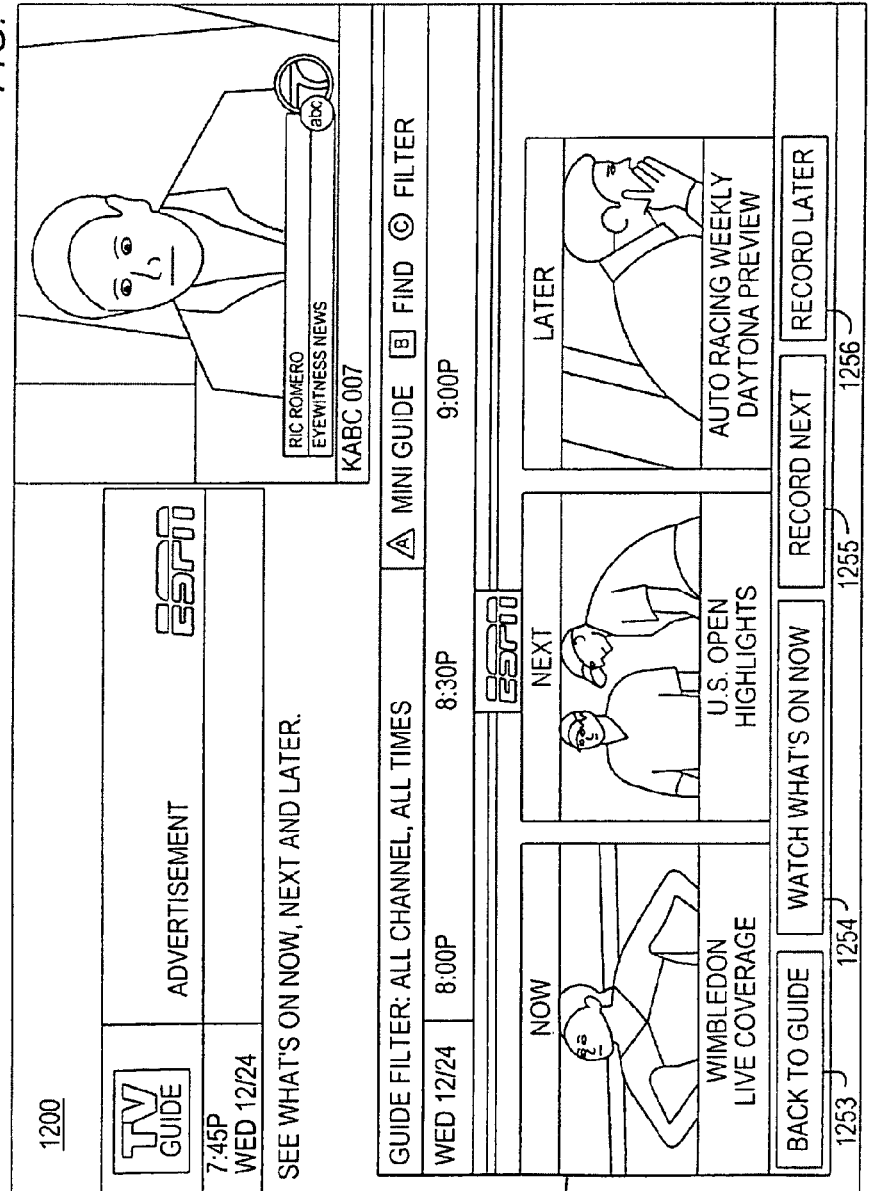
FIG. 12 shows yet another illustrative interactive television application display screen having an expanded interactive channel advertisement in accordance with the present invention.

Another illustrative interactive channel advertisement display screen 1100 is shown in FIG. 11. Display screen 1100 contains interactive channel advertisement 1150 promoting the ESPN network. Interactive channel advertisement 1150 offers to provide a "quick view" of the television program that is currently being broadcast on ESPN (i.e., "now"), the television program that is going to be broadcast next (i.e., "next"), and the television program that is going to be broadcast later (i.e., "later"). Illustrative expanded interactive channel advertisement 1150 in display screen 1200 is shown in FIG. 12. Expanded interactive channel advertisement 1150 contains the titles and images from the ESPN programs that are scheduled to be broadcast "now", "next", and "later". Selectable option 1253 may exit the expanded channel advertisement and return to the program guide display, selectable option 1254 may tune the television system to the television program broadcast "now", and selectable options 1255 and 1256 may permit the user to setup recordings for television programs broadcast "next" and "later".

In some other embodiments, the featured programs may be scheduled for any time, channel, and date. According to some embodiments, previously broadcast programs may be similarly featured (i.e., "before"). "Before" programs may be previously broadcast programs that are presently available from network-based video recorder services, video-on-demand subscriptions, or personal recordings. Additional options within expanded interactive channel advertisement 1150 may allow the user to access additional information about the featured programs, set reminders, access previews of featured programs, and access programs that are available as video-on-demand or from a network-based or personal video recorder.

Figure 13:
FIG. 13 shows still yet another illustrative interactive television application display screen having an interactive channel advertisement in accordance with the present invention.

Another illustrative interactive channel advertisement display screen 1300 is shown in FIG. 13. Display screen 1300 contains channel advertisement 1350 promoting a special feature from the program "Queer Eye for the Straight Guy" sponsored by Nissan (™). When selected by the user, the interactive television system may display the special feature on the television display. The special feature may be an episode of a program, a portion of a program, a preview of a program, a special scene from a program, or may feature content that is not otherwise available to the user. In some embodiments, the service provider may charge the user or require the user to perform specified actions, such as, viewing information about a sponsor, before, after, or while displaying the special feature. While the special feature depicted in the present embodiment is a video clip, it should be understood that special features may also include, for example, audio clips, pictures, text, and interactive television applications.

Figure 14:
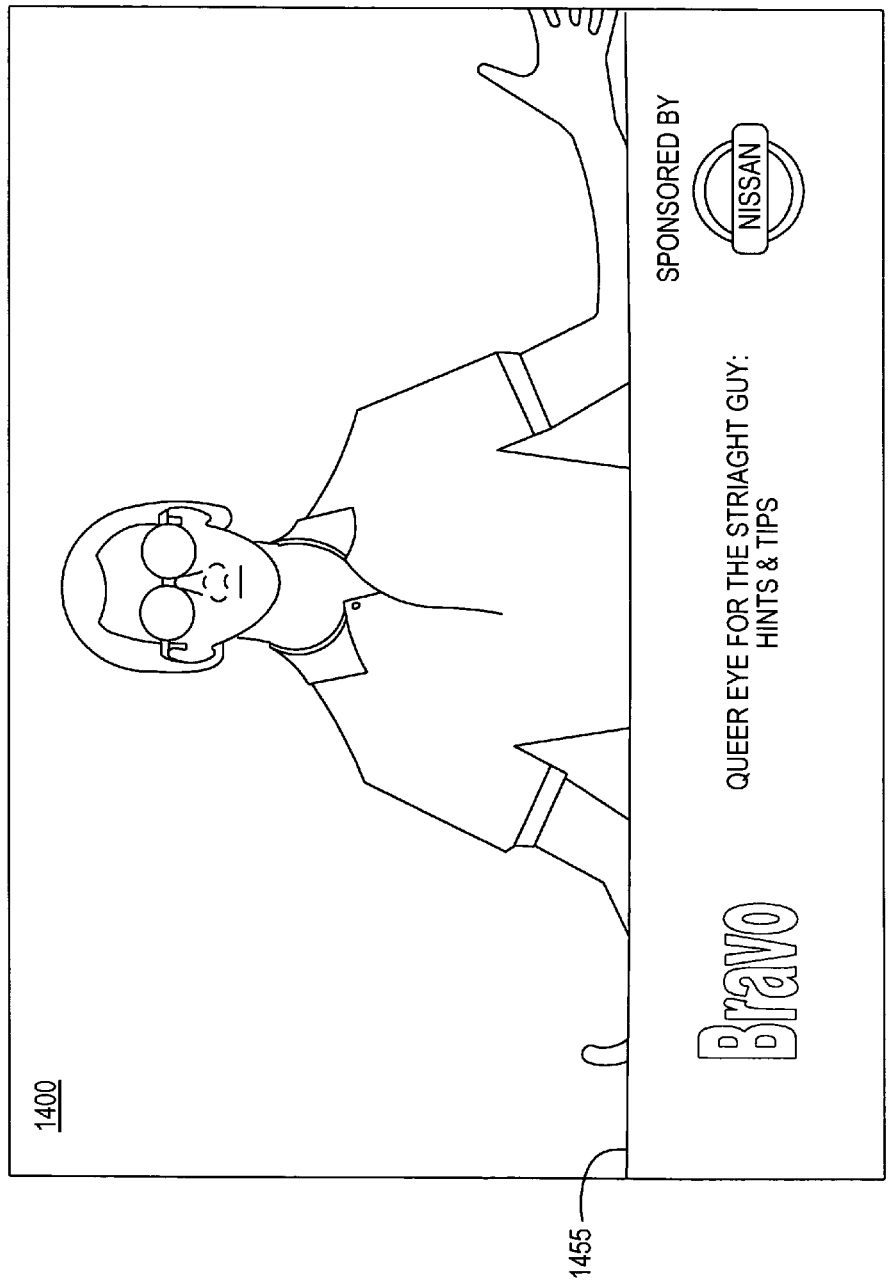
FIG. 14 shows an illustrative display screen with video related to the channel advertisement of FIG. 13 and a semi-transparent overlay display in accordance with the present invention.

FIG. 14 shows an illustrative display screen 1400 showing the video for the special feature and a semitransparent overlay 1455 that may contain program and sponsorship information. Overlay 1455 may also contain an advertisement. The special feature may attract user interest and may entice the user to view the sponsorship or advertisement information contained in overlay 1455. Semitransparent overlay 1455 may appear for a brief time at the beginning of the special feature or may remain on the display screen for the throughout the display of the special feature to, the user's exposure to the sponsor information or the advertisement information. In some embodiments, semitransparent overlay 1455 may also contain selectable options and interactive content related to the displayed feature.

Figure 15:
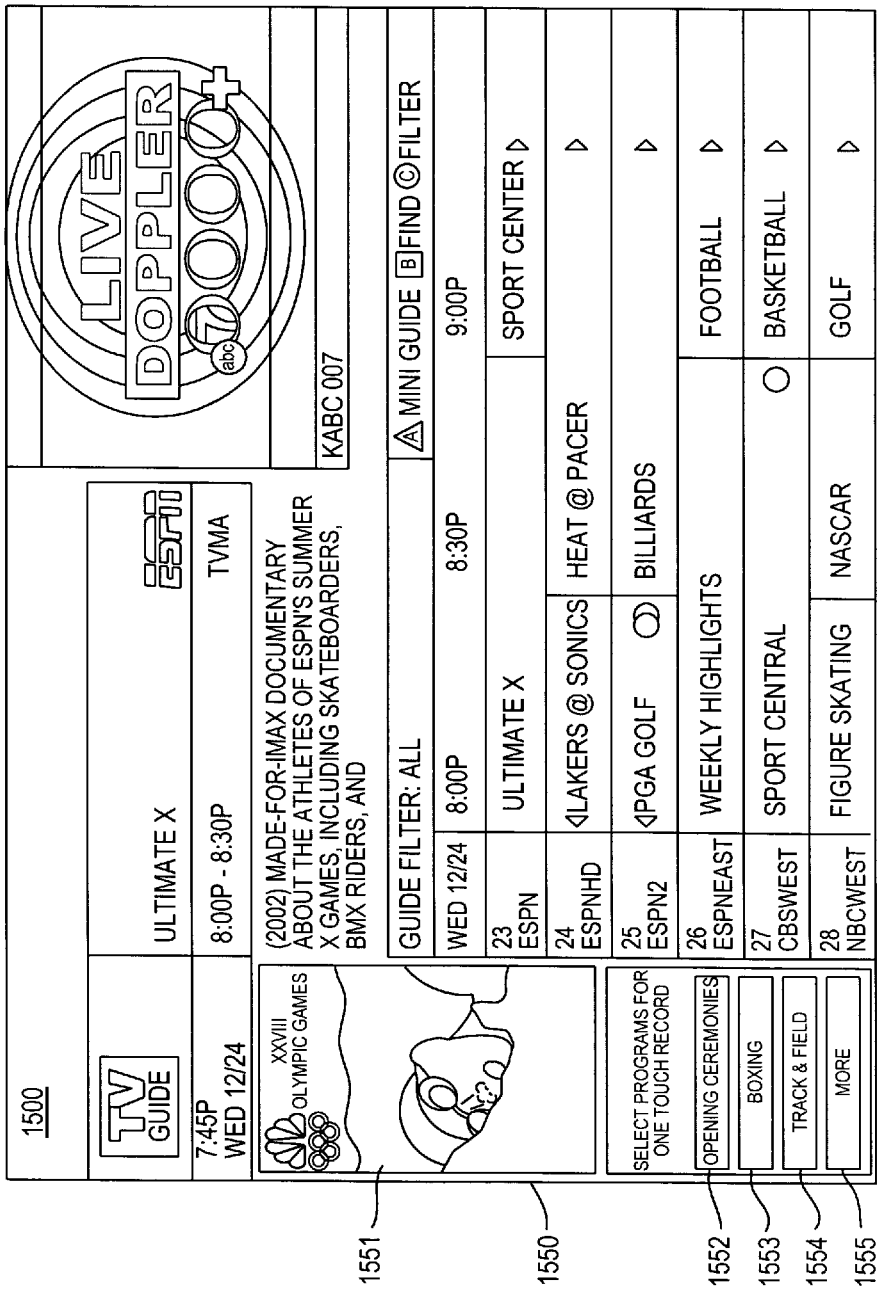
FIG. 15 shows an illustrative interactive television application display screen having an interactive advertisement in accordance with the present invention.
Figure 16:
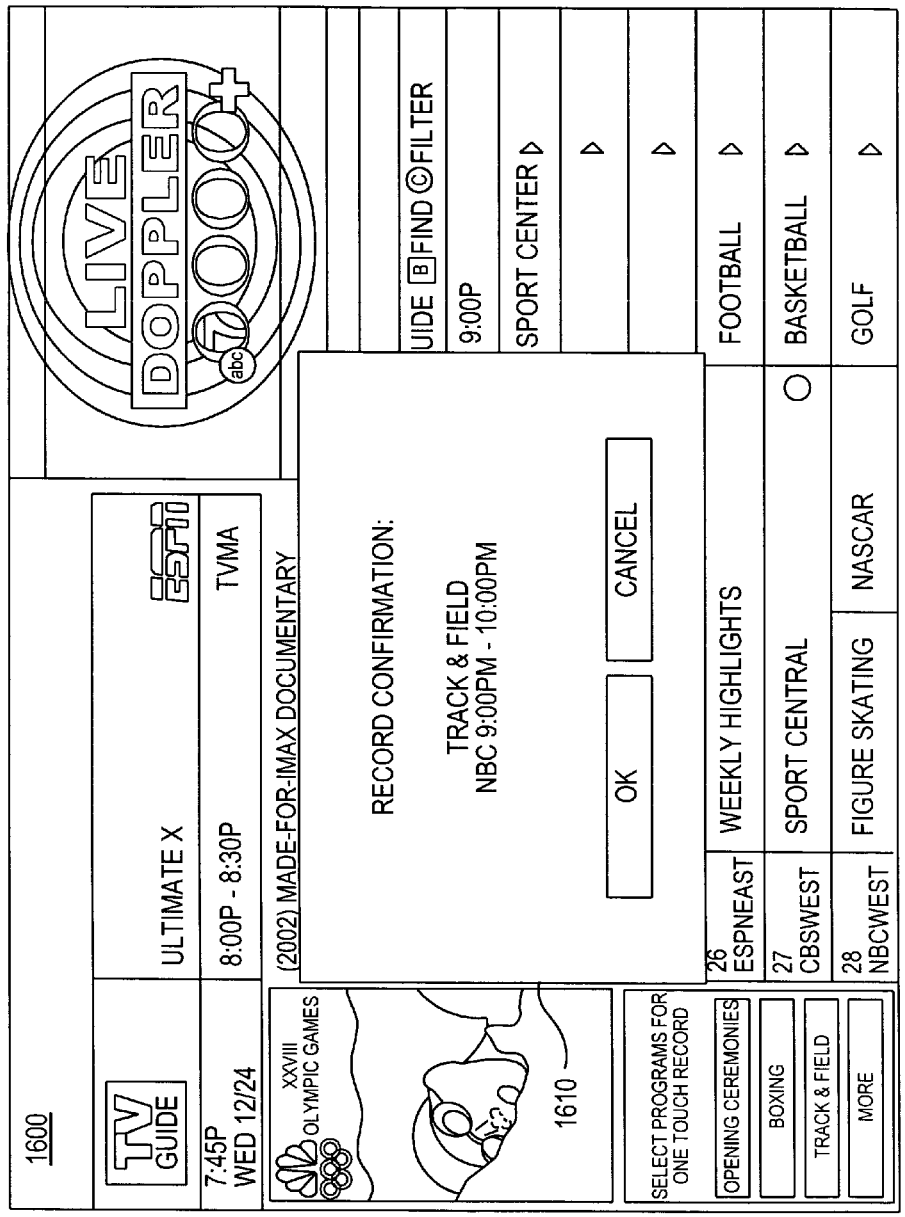
FIG. 16 shows the illustrative interactive television application display screen having the interactive advertisement of FIG. 15 with an overlaid window in accordance with the present invention.

FIGS. 15 through 18 illustrate interactive television application display screens having interactive advertisements that are not located within the program listing grid guide. Instead, these interactive advertisements are located elsewhere in the interactive television application display screen. FIG. 15 shows illustrative display screen 1500 having an interactive advertisement 1550 adjacent to the grid guide. The content of interactive advertisement 1550 may remain the same or may rotate between multiple interactive advertisements. Further, the location of interactive advertisement 1550 may also change or alternate.

Interactive advertisement 1550 promotes the Olympic Games broadcast on NBC. Interactive advertisement 1550 contains representative image 1551. In another embodiment, interactive advertisement 1550 may contain additional content, such as, a video window containing a live television broadcast or video clips from the Olympic Games. Interactive advertisement 1550 may contain selectable options 1552, 1553, 1554, and 1555. The user may be able to navigate the highlight region from the program listings in the grid guide to the selectable options of interactive advertisement 1550 by using remote control 400 (FIG. 4) or other user input interface (e.g., user input interface 614 (FIG. 6)). Selecting options 1552, 1553, or 1554 may set the interactive television system to record a specific Olympic event, namely, the Opening Ceremonies, Boxing, and Track & Field. According to some embodiments, selecting one of the options, such as, option 1554 for Track & Field may cause the interactive television system application to display a confirmation prompt, such as confirmation prompt 1610 shown in FIG. 16. Alternatively, the recording may be set without displaying a confirmation prompt. Selecting option 1555 may cause additional information to be displayed or additional options to be presented to the user. For example, a window may be overlaid over the interactive television application display, interactive advertisement 1550 may expand, or a new interactive television application display screen may be presented. Further, it should be understood that in some embodiments interactive advertisement 1550 may provide additional selectable options and content similar to the content and options provided by the previously described interactive channel advertisements.

Figure 17:
FIG. 17 shows another illustrative interactive television application display screen having an interactive advertisement in accordance with the present invention.
Figure 18:
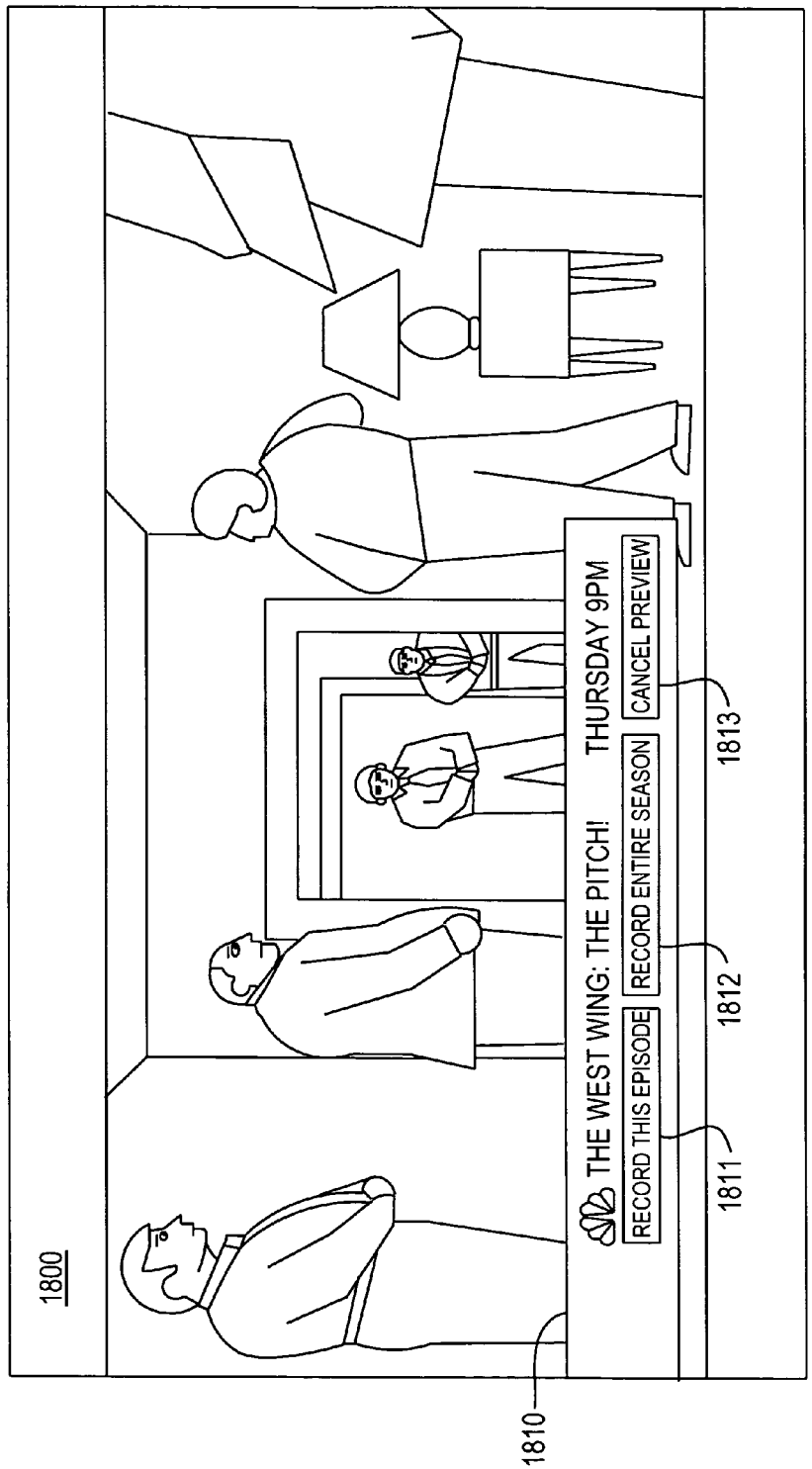
FIG. 18 shows an illustrative display screen displaying a preview of a television program with an overlay having selectable options in accordance with the present invention.

FIG. 17 shows another display screen 1700 having interactive advertisements 1701, 1702, 1703, 1704, and 1705. These interactive advertisements may promote upcoming television programs. The interactive advertisements may display information, such as, program title, broadcast time, broadcast channel, network logo, and program information. Any other suitable information may also be displayed in the interactive advertisements. Selecting an interactive advertisement, such as, interactive advertisement 1701 may cause a preview to be displayed for the television program being promoted. FIG. 18 shows illustrative display screen 1800 with a preview of the television program "The West Wing" displayed on a substantially full portion of the screen. Display screen 1800 also contains interactive overlay window 1810. Interactive window 1810 may contain information about the previewed television program including, for example, program title, episode title, channel, network logo, and program or episode information. Interactive overlay window 1810 may also contain selectable options, such as, options 1811, 1812, and 1813. Option 1811 may allow the user to record the episode being previewed, option 1812 may allow the user to record the entire season of the program being previewed, and option 1813 may cancel the preview and return the user to the interactive television application. Other selectable options may also be provided in accordance with some other aspects of the present invention.

Figure 19:
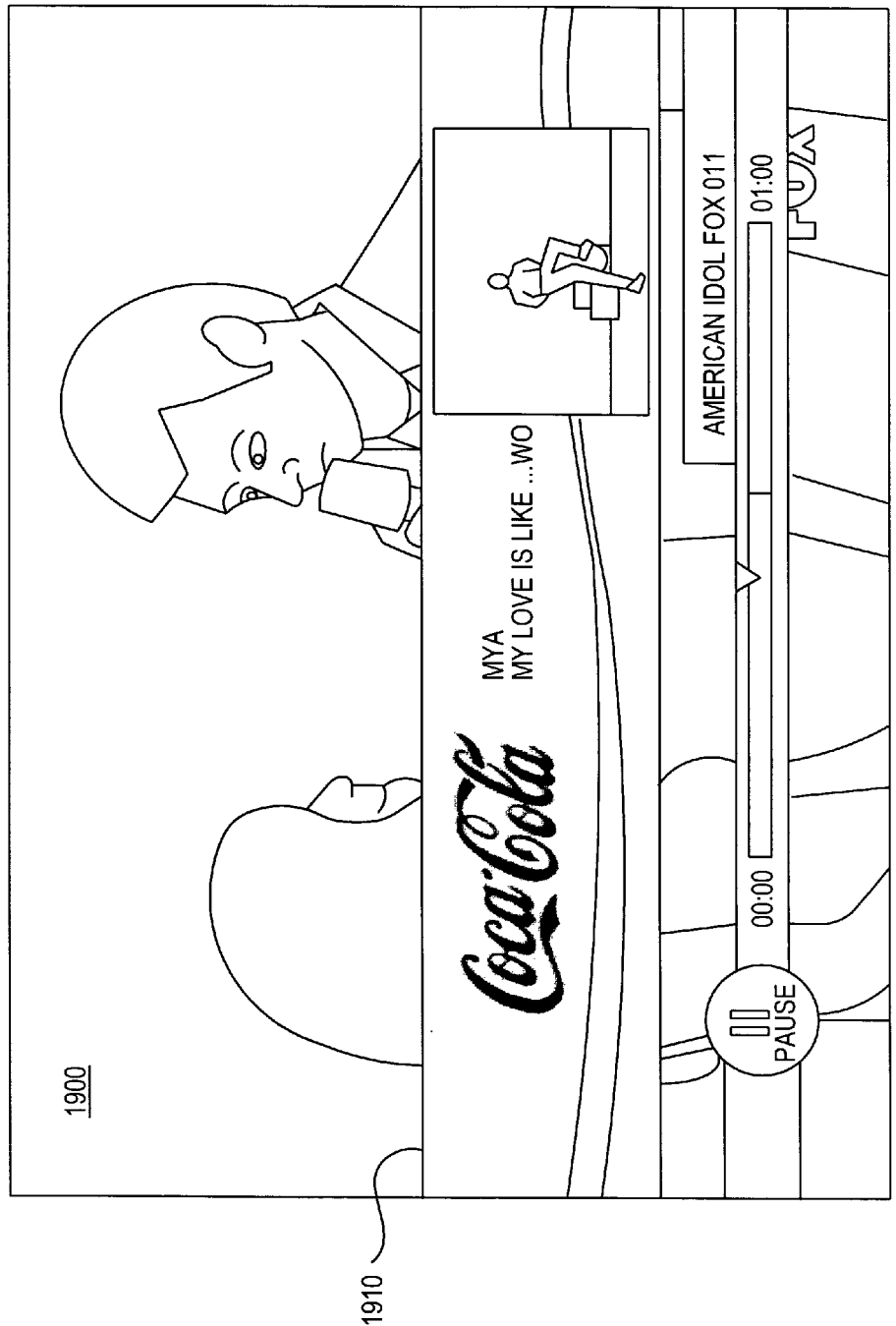
FIGS. 19 and 20 show an illustrative interactive television display screens having interactive advertisements overlaying television programming.
Figure 20:
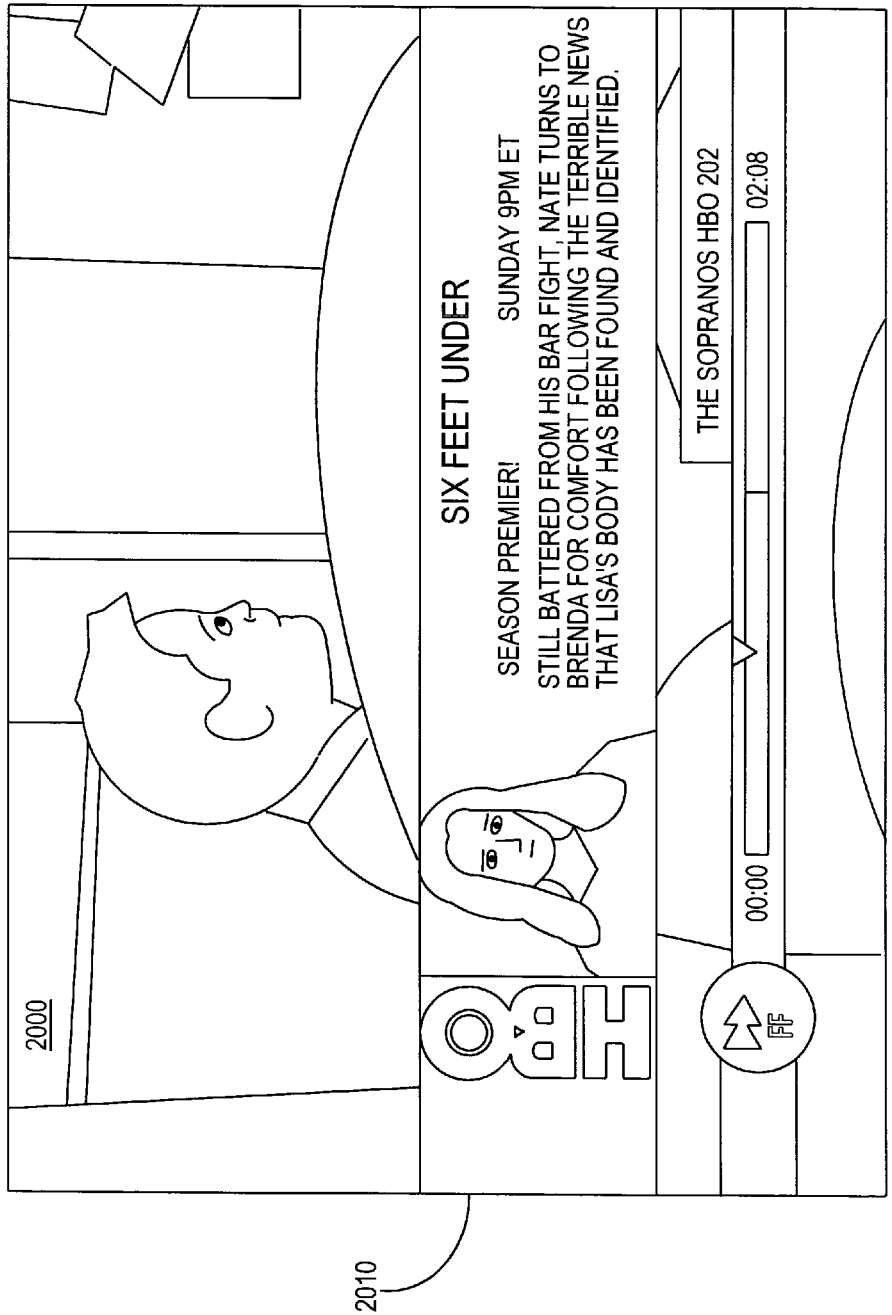

FIGS. 19 and 20 illustrate yet another embodiment of the present invention. FIGS. 19 and 20 show interactive advertisements 1910 and 2010 displayed over portions of the television programs being viewed by the user. In accordance with this embodiment, the interactive advertisements may be displayed so as not to disturb the user while the user is watching a television program. For example, interactive advertisements 1910 and 2010 may be displayed when a users pauses, rewinds, or fast-forwards video-on-demand content, previously recorded content, content stored on the a digital video recorder, any other suitable content. Interactive advertisements 1910 and 2010 may promote television programming or any other suitable content. The interactive advertisements may include for example, text, graphics, video, and audio content. The interactive advertisements may also include interactive content and interactive options, such as those described with reference to some of the previous embodiments of the present inventions.

Figure 21:
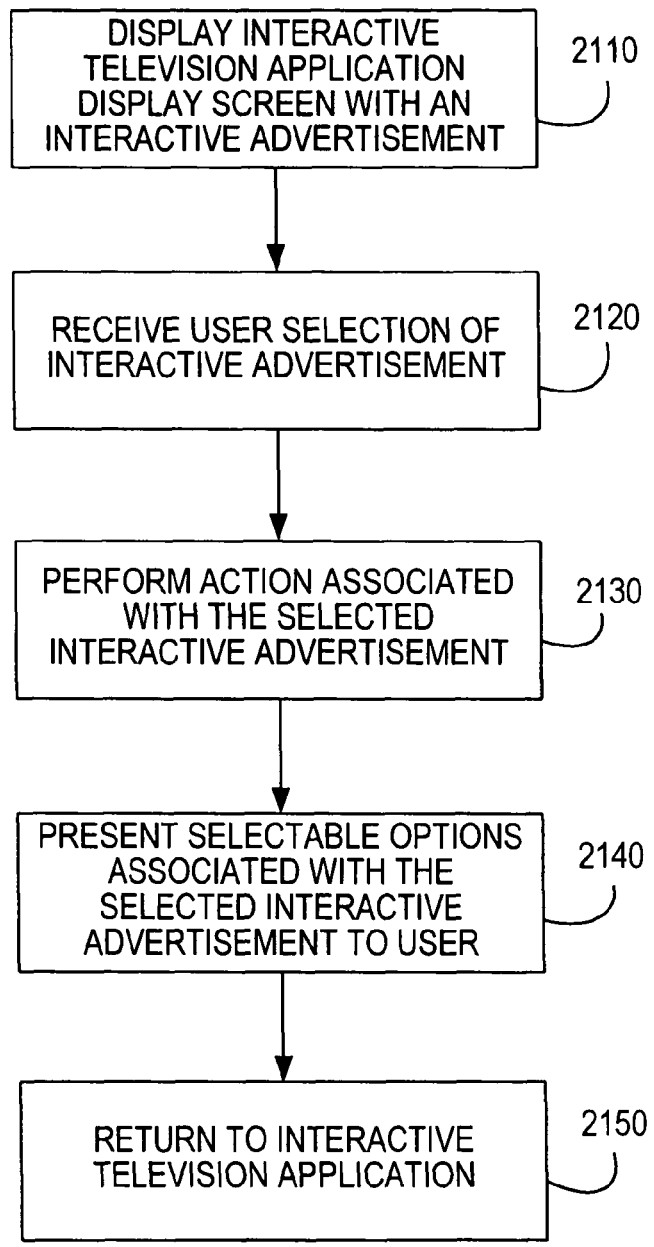
FIG. 21 is a flow chart of illustrative steps involved in providing interactive advertisements in accordance with the present invention.

FIG. 21 is a flow chart of illustrative steps involved in providing interactive advertisements and program promotions in an interactive television system in accordance with some embodiments of the present invention. At step 2110, the interactive television application (e.g., an interactive television program guide) display screen having an interactive advertisement is displayed. For example, an interactive television program guide screen may have an interactive channel advertisement interspersed with program listings (e.g., display screen 700 (FIG. 7)). According to another example, an interactive advertisement may be displayed adjacent to the program listings in an interactive television program guide display (e.g., display screen 1500 (FIG. 15)). At step 2120, the interactive television system may receive the selection of the interactive advertisement from a user. For example, the user may navigate a highlight region to the interactive advertisement and select the advertisement (e.g., by using remote control 400 (FIG. 4), user input interface 614 (FIG. 6), or other user input interface).

At step 2130, the interactive television system performs an action associated with the interactive advertisement selected at step 2120. For example, an interactive channel advertisement may expand to cover some program listings shown in an interactive television program guide grid guide. As another example, television content, such as a television preview may be displayed, or a reminder or recording may be set.

At step 2140 selectable options associated with the selected interactive advertisement may be presented to the user. The options may appear, for example, in an expanded interactive channel advertisement, in an window overlaid on a display screen, or in any suitable display. Finally after, the user is given the opportunity to select one or more the selectable options, at step 2150 the interactive television system may return to the interactive television application.

Figure 22:
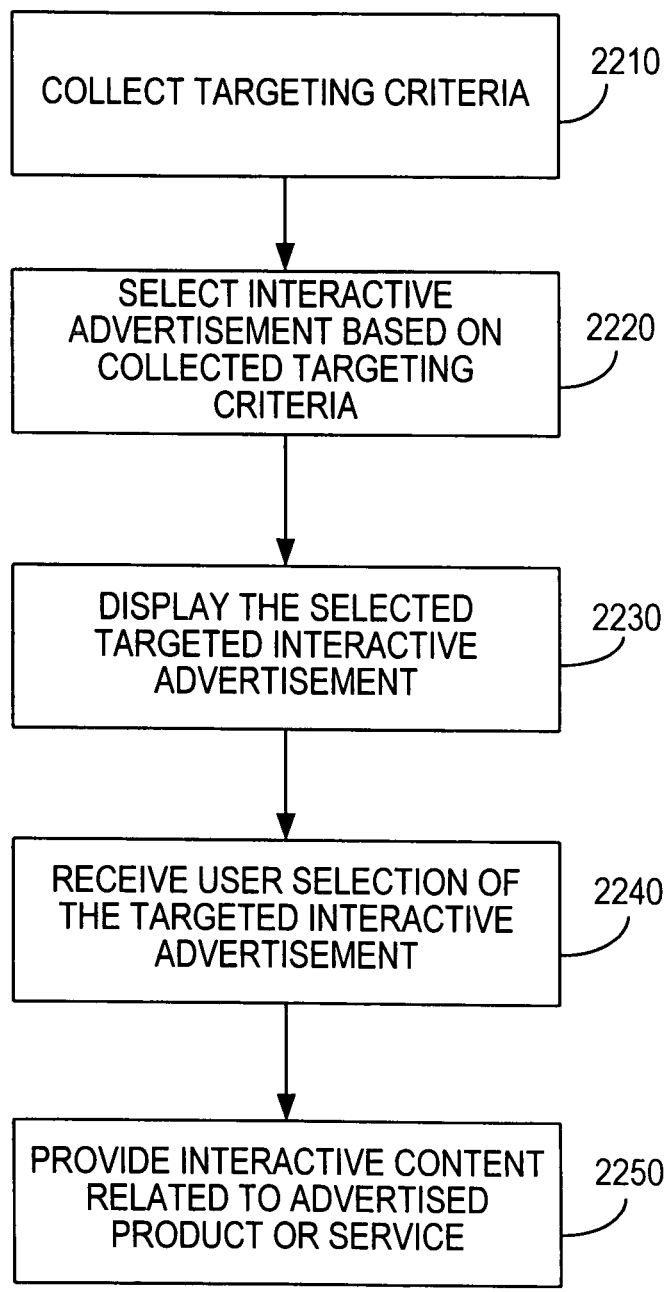
FIG. 22 is a flow chart of illustrative steps involved in providing targeted interactive advertisements and program promotions in accordance with the present invention.

FIG. 22 is a flow chart of illustrative steps involved in providing targeted interactive advertisements and program promotions within an interactive television system in accordance with some embodiments of the present invention. These targeted interactive advertisements and program promotions may be displayed to particular users or within particular interactive television application display screens in order to increase user attention and interest in the subject of the advertisements. It should be understood that any interactive advertisement or program promotion or interactive content within the present application may be targeted in accordance with this embodiment of the present application.

Interactive advertisements may be targeted to users based on any number of suitable criteria, such as user profile information, user interests, user viewing habits, currently displayed media, currently displayed information, the location of the advertisement within an interactive television program guide display screen, current events, geographic location, environmental conditions, or any other suitable factors. For example, an interactive advertisement may be targeted based on the current or forecasted weather. One interactive advertisement may be targeted to rainy weather, while another advertisement may be targeted to sunny weather. These two advertisements may be different versions of the same advertisement (i.e., two advertisements from the same sponsor or two versions of an advertisement for the same product or service) or different and unrelated advertisements. As another example, an interactive advertisement may be targeted to particular news or sporting events (e.g., targeting advertisements for White Sox merchandise just after they won the World Series and targeting advertisements for DVDs staring Charlize Theron just after she won an Oscar). Interactive television systems that provide targeted advertisements within an interactive television application are described, for example, in United States Patent Application Publication Nos. 2002/0042914, published Apr. 11, 2002, 2003/0110499, published Jun. 12, 2003, 2003/0208756, published Nov. 6, 2003, 2004/0078809, published Apr. 22, 2004, and 2004/0194138, published Sep. 30, 2004. These publications are incorporated herein by reference in their entireties.

At step 2210, targeting criteria may be collected by the interactive television system. Targeting criteria may include information relating to user interests (e.g., user profile information), user interactions (e.g., monitored user interactions with the interactive television system), currently displayed media or information, or any other suitable criteria that may be used to target advertisements or program promotions to users. At step 2220, a targeted interactive advertisement or program promotion may be selected from a plurality interactive advertisements and program promotions based on the collected targeting criteria. For example, a targeted interactive advertisement may be selected from a plurality of interactive advertisements within an advertisement database. The advertisement database may be stored locally (e.g., on user equipment 108 (FIG. 1)) or remotely (e.g., on data source 120 (FIG. 1)). The selection of the targeted interactive application may also be performed locally or remotely.

At step 2230, a interactive television application (e.g., an interactive television program guide) display screen having the selected targeted interactive advertisement is displayed. The targeted interactive advertisement may include an indication that selection of the advertisement by the user will cause presentation of interactive content. At step 2240, the interactive television system may receive the selection of the targeted interactive advertisement from a user. At step 2250, in response to the user selection of the targeted interactive advertisement, the interactive television system may provide interactive content related to the advertised product or service.

Figure 23:
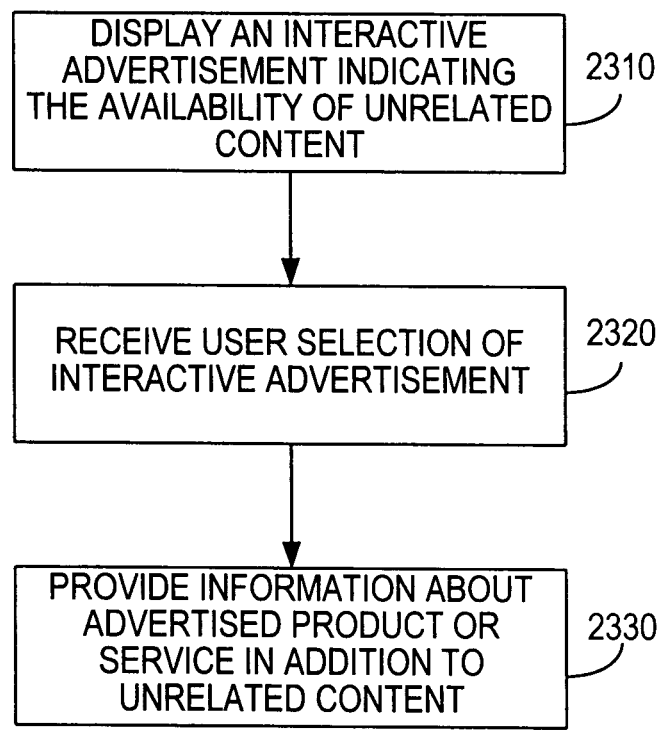
FIG. 23 is a flow chart of illustrative steps involved in providing advertisements and program promotions having content unrelated to the product or service being advertised in accordance with the present invention.

FIG. 23 is a flow chart of illustrative steps involved in providing advertisements and program promotions having content unrelated to the product or service being advertised within an interactive television system in accordance with some embodiments of the present invention. At step 2310, the interactive television application (e.g., an interactive television program guide) display screen having an interactive advertisement is displayed. The interactive advertisement may include an indication that selection of the advertisement by the user will cause presentation of content unrelated to the product or service being advertised. At step 2320, the interactive television system may receive the selection of the interactive advertisement from a user. At step 2330, in response to the user selection of the interactive advertisement, the interactive television system provides information about the advertised product or service in addition to the content unrelated to the advertised product or service.

The foregoing is merely illustrative of the principles of this invention and various modifications can be made by those skilled in the art without departing from the scope and spirit of the invention.

What is claimed is:

1. A method for enticing users to participate in advertising opportunities comprising:
   generating for display, on a first user device, an interactive advertisement for a first product or service and a second product or service, wherein the interactive advertisement indicates that selection of the advertisement by the user will cause a presentation of content related to the first product or service and content related to the second product or service;
   receiving a user input selecting the interactive advertisement, and in response to receiving the user input;
   generating for display the content related to the first product or service and a first option to download the content related to the second product or service to a second user device, wherein the second user device is different from the first user device displaying the interactive advertisement,
   expanding the interactive advertisement to cover only some of a plurality of media content listings in a display screen, and
   generating for display a second option associated with the expanded interactive advertisement, wherein the second option is an option to select a song to be played from an album or artist indicated by the advertisement.

2. The method of claim 1 wherein the content related to the second product or service comprises musical content indicated by the advertisement.

3. The method of claim 2 wherein the musical content comprises at least one song from the album indicated by the advertisement.

4. The method of claim 2 wherein the musical content comprises at least one song from the artist indicated by the advertisement.

5. The method of claim 2 wherein the musical content further comprises related video content.

6. The method of claim 1 wherein the second option comprises recording the content related to the second product or service.

7. The method of claim 1 wherein the interactive advertisement comprises a targeted interactive advertisement.

8. A method for enticing users to participate in advertising opportunities, comprising:
   generating for display on a display screen comprising a plurality of media content listings and at least one interactive channel advertisement for a product or service, the interactive channel advertisement including promotional content that indicates that selection of the advertisement by the user will cause presentation of interactive content;
   enticing a user to select the at least one interactive channel advertisement;
   receiving a user input selecting the at least one interactive channel advertisement;
   expanding, in response to receiving the user input, the at least one interactive channel advertisement to cover only some of the plurality of media content listings in the display screen, wherein the expanded interactive channel advertisement includes a predetermined set of visually enhanced media content listings; and
   generating for display selectable options associated with each of the visually enhanced media content listings in the expanded interactive channel advertisement.

9. The method of claim 8 further comprising:
   generating for display a media asset in response to the user input; and
   generating for display the expanded interactive channel advertisement overlaid on the media asset.

10. The method of claim 8 wherein the selectable options comprise an option to display a previously broadcast media asset, wherein generating for display the previously broadcast media asset comprises:
    determining the availability of the previously broadcast media asset; and
    accessing the previously broadcast media asset in response to the determining.

11. The method of claim 8 wherein the at least one interactive channel advertisement comprises a targeted interactive advertisement.

12. A system for enticing users to participate in advertising opportunities, comprising:
    control circuitry configured to:
      generate for display, on a first user device, an interactive advertisement for a first product or service and a second product or service, wherein the interactive advertisement indicates that selection of the advertisement by the user will cause a presentation of content related to the first product or service and content related to the second product or service;
      receive a user input selecting the interactive advertisement, and
      in response to receiving the user input;
        generate for display the content related to the first product or service and a first option to download the content related to the second product or service to a second user device, wherein the second device is different from first device displaying the interactive advertisement,
        expand the interactive advertisement to cover only some of a plurality of media content listings in a display screen, and
        generate for display a second option associated with the expanded interactive advertisement, wherein the second option is an option to select a song to be played from an album or artist indicated by the advertisement.

13. The system of claim 12 wherein the content related to the second product or service comprises musical content indicated by the advertisement.

14. The system of claim 13 wherein the musical content comprises at least one song from the album indicated by the advertisement.

15. The system of claim 13 wherein the musical content comprises at least one song from the artist indicated by the advertisement.

16. The system of claim 13 wherein the musical content further comprises related video content.

17. The system of claim 12 wherein the second option comprises recording the content related to the second product or service.

18. The system of claim 12 wherein the interactive advertisement comprises a targeted interactive advertisement.

19. A system for enticing users to participate in advertising opportunities, comprising:
control circuitry configured to:
generate for display on a display screen comprising a plurality of media content listings and at least one interactive channel advertisement for a product or service, the interactive channel advertisement including promotional content that indicates that selection of the advertisement by the user will cause presentation of interactive content;
entice a user to select the at least one interactive channel advertisement;
receive a user input selecting the at least one interactive channel advertisement;
expand, in response to the user input, the at least one interactive channel advertisement to cover only some of the plurality of media content listings in the display screen, wherein the expanded interactive channel advertisement includes a predetermined set of visually enhanced media content listings; and
generate for display selectable options associated with each of the visually enhanced media content listings in the expanded interactive channel advertisement.

20. The system of claim 19 further configured to:
generate for display a media asset in response to the user input; and
generate for display the expanded interactive channel advertisement overlaid on the media asset.

21. The system of claim 19 wherein the selectable options comprise an option to display a previously broadcast media asset, wherein generating for display the previously broadcast media asset comprises:
determining the availability of the previously broadcast media asset; and
accessing the previously broadcast media asset in response to the determining.

22. The system of claim 19 wherein the at least one interactive channel advertisement comprises a targeted interactive advertisement.

23. The method of claim 8 wherein the selectable options comprise an option to shrink the expanded interactive channel advertisement.

24. The method of claim 1, wherein the second user device is a media device capable of playing audio/visual content.

25. The system of claim 12, wherein the second user device is a media device capable of playing audio/visual content.

\* \* \* \* \*